US012286143B2

(12) United States Patent
Yoshikawa et al.

(10) Patent No.: US 12,286,143 B2
(45) Date of Patent: Apr. 29, 2025

(54) TRAFFIC COMMUNICATION SYSTEM, BASE STATION, VEHICLE, MOBILE STATION, AND MESSAGE TRANSMISSION METHOD

(71) Applicant: KYOCERA Corporation, Kyoto (JP)

(72) Inventors: Takatoshi Yoshikawa, Hirakata (JP); Jun Shimamura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 860 days.

(21) Appl. No.: 17/397,516

(22) Filed: Aug. 9, 2021

(65) Prior Publication Data

US 2021/0362756 A1 Nov. 25, 2021

Related U.S. Application Data

(63) Continuation of application No. PCT/JP2020/005597, filed on Feb. 13, 2020.

(30) Foreign Application Priority Data

| Feb. 15, 2019 | (JP) | ................................. 2019-025315 |
| Feb. 15, 2019 | (JP) | ................................. 2019-025319 |
| Mar. 12, 2019 | (JP) | ................................. 2019-044756 |

(51) Int. Cl.
*B61L 1/14* (2006.01)
*B61L 1/18* (2006.01)
*B61L 25/02* (2006.01)

(52) U.S. Cl.
CPC ........ *B61L 1/14* (2013.01); *B61L 1/18* (2013.01); *B61L 25/02* (2013.01)

(58) Field of Classification Search
CPC .... B61L 1/14; B61L 1/18; B61L 25/02; B61L 29/00; B61L 29/08
See application file for complete search history.

(56) References Cited

U.S. PATENT DOCUMENTS

| 10,363,950 B2* | 7/2019 | Worthey, Sr. ......... B61L 23/041 |
| 2014/0263857 A1* | 9/2014 | Huntimer .............. B61L 29/246 |
| | | 246/122 R |
| 2017/0217463 A1* | 8/2017 | DeJarnatt .............. B61L 23/041 |

FOREIGN PATENT DOCUMENTS

| JP | 2002-274384 A | 9/2002 |
| JP | 2003-075170 A | 3/2003 |

(Continued)

OTHER PUBLICATIONS

Association of Radio Industries and Businesses "700 MHz Band Intelligent Transport Systems ARIB-STD T109 ver. 1.3", Version 1.3, pp. 1-29, Jul. 27, 2017.

*Primary Examiner* — Robert J McCarry, Jr.
(74) *Attorney, Agent, or Firm* — Studebaker Brackett PLLC

(57) ABSTRACT

A roadside unit 40 that controls a traffic safety apparatus provided at a railroad crossing 150 at which a general road 120 on which a vehicle 20 travels and a railroad track 110 on which a railroad vehicle 10 given priority over the vehicle 20 travels intersect receives a first message from the railroad vehicle 10. The first message includes an information element indicating a railroad vehicle as a type of a transmission source vehicle, and an information element indicating at least one of a position of the railroad vehicle 10 or speed of the railroad vehicle 10. In the roadside unit 40, a communicator transmits a second message to the vehicle 20. The second message includes an information element related to waiting time for passing of the railroad vehicle 10 through the railroad crossing 150.

14 Claims, 14 Drawing Sheets

(56) References Cited

FOREIGN PATENT DOCUMENTS

| | | |
|---|---|---|
| JP | 2003-288679 A | 10/2003 |
| JP | 3889651 B2 | 3/2007 |
| JP | 2009-122908 A | 6/2009 |
| JP | 2009-182826 A | 8/2009 |
| JP | 2011-192193 A | 9/2011 |
| JP | 2017-004214 A | 1/2017 |
| WO | 2016/135944 A1 | 9/2016 |

\* cited by examiner

TRAFFIC COMMUNICATION SYSTEM, BASE STATION, VEHICLE, MOBILE STATION, AND MESSAGE TRANSMISSION METHOD

RELATED APPLICATIONS

The present application is a continuation based on PCT Application No. PCT/JP2020/005597, filed on Feb. 13, 2020, which claims the benefit of Japanese Patent Application No. 2019-025315 filed on Feb. 15, 2019, Japanese Patent Application No. 2019-025319 filed on Feb. 15, 2019, and Japanese Patent Application No. 2019-044756 filed on Mar. 12, 2019. The content of which is incorporated by reference herein in their entirety.

TECHNICAL FIELD

The present disclosure relates to a traffic communication system, a base station, a vehicle, a mobile station, and a message transmission method.

BACKGROUND ART

In intelligent traffic communication systems (for example, Intelligent Transport System (ITS)), a technology of performing communication between a roadside unit being a base station provided in the vicinity of a road and a vehicle or an on-board apparatus being a mobile station provided in a vehicle has hitherto been proposed (for example, see NPL 1).

CITATION LIST

Non-Patent Literature

NPL 1: Association of Radio Industries and Businesses, "700 MHz BAND INTELLIGENT TRANSPORT SYSTEMS ARIB-STD T109 ver. 1.3", [online], Jul. 27, 2017, [searched on Jun. 22, 2018], Internet <http://www.arib.or.jp/tyosakenkyu/kikaku_tushin/tsushin_kikaku_number.html>

SUMMARY OF INVENTION

A base station according to a first aspect controls a traffic safety apparatus provided at an intersection at which a general road on which a mobile station travels and a dedicated road on which a specific vehicle given priority over the mobile station travels intersect. The base station includes a communicator configured to receive a first message from the specific vehicle, the first message including an information element indicating the specific vehicle as a type of a transmission source vehicle and an information element indicating at least one of a position of the specific vehicle or speed of the specific vehicle. The communicator is configured to transmit a second message to the mobile station, the second message including an information element related to waiting time for passing of the specific vehicle through the intersection.

A specific vehicle according to a second aspect is a vehicle given priority over a mobile station traveling on a general road. The specific vehicle includes a transmitter configured to transmit a message to at least one of a base station or the mobile station, the base station being configured to control a traffic safety apparatus provided at an intersection at which the dedicated road on which the specific vehicle travels and the general road intersect, the message including an information element indicating the specific vehicle as a type of a transmission source vehicle and an information element indicating at least one of a position of the specific vehicle or speed of the specific vehicle.

A mobile station according to a third aspect is an apparatus traveling on a general road. The mobile station includes: a receiver configured to receive a message from a base station configured to control a traffic safety apparatus provided at an intersection at which a dedicated road on which a specific vehicle given priority over the mobile station travels and the general road intersect, the message including an information element related to waiting time for passing of the specific vehicle through the intersection; and a controller configured to perform control such that information related to the waiting time for passing is presented based on the message.

A mobile station according to a fourth aspect is an apparatus traveling on a general road. The mobile station includes: a communicator configured to receive a message from a specific vehicle, the message including an information element indicating the specific vehicle given priority over the mobile station as a type of a transmission source vehicle and an information element indicating at least one of a position of the specific vehicle or speed of the specific vehicle; and a controller configured to perform control such that information related to waiting time for passing of the specific vehicle through an intersection at which the dedicated road on which the specific vehicle travels and the general road intersect is presented based on the message.

A traffic communication system according to a fifth aspect includes: a vehicle; and a base station configured to control a traffic safety apparatus provided at an intersection at which a general road on which the vehicle travels and a dedicated road on which a specific vehicle given priority over the vehicle travels intersect. The base station is configured to transmit a message to the vehicle, the message including an information element indicating that the intersection is present and an information element indicating whether or not a traffic light for the general road is provided as the traffic safety apparatus. The vehicle includes a communicator configured to receive the message, and a controller configured to determine whether or not the vehicle needs to momentarily stop before entering the intersection, based on the message.

A base station according to a sixth aspect controls a traffic safety apparatus provided at an intersection at which a general road on which a vehicle travels and a dedicated road on which a specific vehicle given priority over the vehicle travels intersect. The base station includes a transmitter configured to transmit a message to the vehicle, the message including an information element indicating that the intersection is present and an information element indicating whether or not a traffic light for the general road is provided as the traffic safety apparatus.

A vehicle according to a seventh aspect includes: a communicator configured to receive a message from a base station configured to control a traffic safety apparatus provided at an intersection at which a general road on which the vehicle travels and a dedicated road on which a specific vehicle given priority over the vehicle travels intersect, the message including an information element indicating that the intersection is present and an information element indicating whether or not a traffic light for the general road is provided as the traffic safety apparatus; and a controller configured to determine whether or not the vehicle needs to momentarily stop before entering the intersection, based on the message.

A base station according to an eighth aspect is provided in a vicinity of a railroad crossing road on which a railroad and a road intersect. The base station includes a transmitter configured to transmit, through radio communication, a message to a vehicle traveling on the road toward an entry side of the railroad crossing road. The transmitter is configured to transmit the message to the vehicle, the message including at least one information element indicating a traffic condition of the road on an exit side of the railroad crossing road.

A mobile station according to a ninth aspect is provided on a vehicle. The mobile station includes a receiver configured to receive, through radio communication, a message from a base station provided in a vicinity of a railroad crossing road, when the vehicle travels on a road toward an entry side of the railroad crossing road at which a railroad and the road intersect. The receiver is configured to receive, from the base station, the message including at least one information element indicating a traffic condition of the road on the exit side of the railroad crossing road.

A vehicle according to a tenth aspect includes the mobile station according to the ninth aspect.

A message transmission method according to an eleventh aspect is a message transmission method in which a base station provided in a vicinity of a railroad crossing road at which a railroad and a road intersect transmits a message to a vehicle through radio communication. The message transmission method includes a step of transmitting a message to the vehicle traveling on the road toward an entry side of the railroad crossing road, the message including an information element indicating a traffic condition of the road on an exit side of the railroad crossing road.

DESCRIPTION OF EMBODIMENTS

Conventional ITS aims to reduce traffic accidents of vehicles such as automobiles that travel on a general road, but does not fully take specific vehicles that travel on a dedicated road (for example, railroad vehicles that travel on a railroad track) into consideration.

Thus, such conventional ITS has room for improvement in provision of assistance for traveling at intersections (for example, railroad crossings) at which a general road and a dedicated road intersect.

In the light of this, the present disclosure enables providing assistance for traveling at intersections at which a general road and a dedicated road intersect.

First Embodiment

A first embodiment will be described with reference to the drawings. Note that, in the following description regarding the drawings, the same or similar parts are denoted by the same or similar reference signs.

Traffic Communication System

Figure 1:
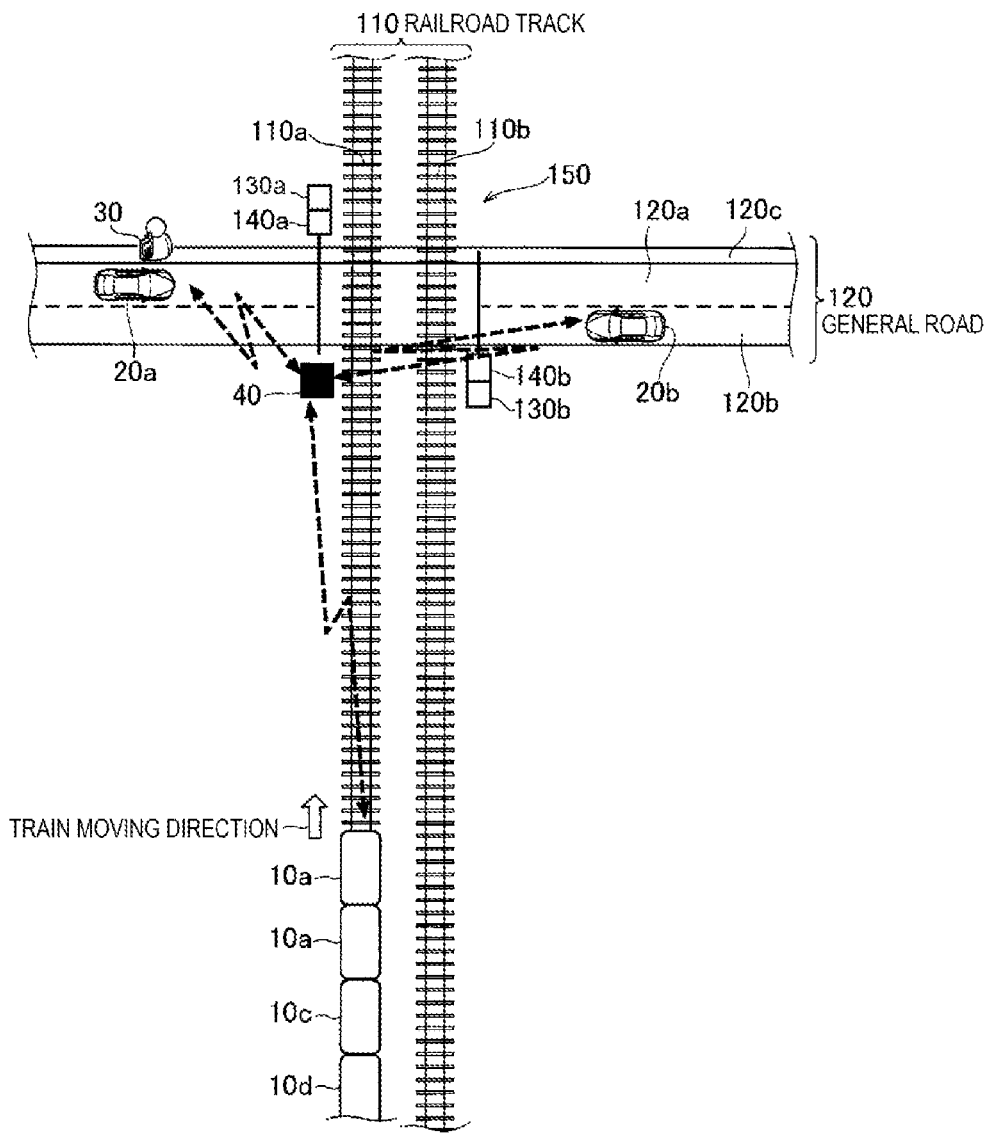
FIG. 1 is a diagram illustrating a configuration of a traffic communication system according to a first embodiment.

FIG. 1 is a diagram illustrating a configuration of a traffic communication system according to the first embodiment.

As illustrated in FIG. 1, the traffic communication system according to the first embodiment includes a railroad track 110 on which a railroad vehicle 10 travels, and a general road 120 on which a vehicle 20 and a passerby carrying a terminal 30 (hereinafter referred to as a passerby terminal 30) travel. The railroad track 110 and the general road 120 intersect at a railroad crossing 150. A roadside unit 40 is installed in the vicinity of the railroad crossing 150.

The railroad vehicle 10 is an example of a specific vehicle that is given priority in traveling over the vehicle 20 and the passerby that travel on the general road 120. A train includes a plurality of the railroad vehicles 10 (10a, 10b, . . . ) being coupled together. The first embodiment describes an example in which the specific vehicle is the railroad vehicle 10. However, the specific vehicle may be any vehicle (for example, a bus) that belongs to public transportation, an automated driving vehicle, or the like.

The railroad track 110 is an example of the dedicated road on which the specific vehicle travels. FIG. 1 illustrates a plurality of the railroad tracks 110 including two railroad tracks 110a and 110b. However, the railroad track 110 may be a single-track railroad track which includes only one railroad track. The train including the plurality of railroad vehicles 10 (railroad vehicles 10*a*, 10*b*, . . . ) moves on the railroad track 110*a* toward the railroad crossing 150.

The vehicle 20 traveling on the general road 120 is an example of a mobile station. FIG. 1 illustrates an example of a four-wheeled motor vehicle as the vehicle 20. However, the vehicle 20 may be a two-wheeled motor vehicle, a three-wheeled motor vehicle, or the like. Further, FIG. 1 illustrates an example of two vehicles 20 (20*a* and 20*b*). However, the number of the vehicles 20 may be three or more.

The passerby terminal 30 held by the passerby traveling on the general road 120 is another example of a mobile station. The passerby terminal 30 may be any sort of terminal as long as the passerby terminal 30 is a terminal of the passerby. Examples of the passerby terminal 30 include a smartphone, a tablet terminal, and a wearable terminal.

Note that, regarding a bicycle, when a communication apparatus mounted on a bicycle is used, the bicycle may be classified as the vehicle 20, whereas when a terminal carried by a driver of a bicycle is used, the terminal may be classified as the passerby terminal 30.

The general road 120 is a road on which an automobile, a bicycle, a pedestrian, and the like to travel. FIG. 1 illustrates an example of the two-lane general road 120 including two traffic lanes 120*a* and 120*b*. However, the general road 120 may be a one-way road including only one traffic lane, or may be a road including three or more traffic lanes. Further, the general road 120 includes a roadside pedestrian walkway 120*c* on which the passerby (passerby terminal 30) travels.

The railroad crossing 150 is an example of an intersection at which the general road and the dedicated road intersect (specifically, at-grade intersection). The railroad crossing 150 may be referred to as a railroad crossing road. At the railroad crossing 150, a traffic safety apparatus is provided.

The traffic safety apparatus provided at the railroad crossing 150 may be referred to as railroad crossing safety equipment. FIG. 1 illustrates an example in which railroad crossing alarms 130 (130*a* and 130*b*) and railroad crossing gates 140 (140*a* and 140*b*) are provided as the traffic safety apparatus. However, the railroad crossing gates 140 need not necessarily be provided.

The railroad crossing alarm 130 is an apparatus for informing passersby, vehicle drivers, and the like traveling on the general road 120 of the presence of the railroad crossing 150, and, when the train approaches, issuing an alarm with sound and light to stop road traffic.

The railroad crossing gate 140 is an apparatus for restricting traveling on the general road 120 in order to let the train travel preferentially. The railroad crossing gate 140 includes a gate bar and a mechanical unit for raising and lowering the gate bar.

The following will describe an example of the first embodiment in which the traffic safety apparatus includes the railroad crossing alarm 130 and the railroad crossing gate 140. However, instead of the railroad crossing alarm 130 and the railroad crossing gate 140, the traffic safety apparatus according to the first embodiment may be a radio unit that transmits various indications to the mobile stations (the vehicle 20 and the passerby terminal 30) by radio. The radio unit transmits a signal for giving an indication as to whether or not traveling across the railroad crossing 150 is permitted, to the mobile stations (the vehicle 20 and the passerby terminal 30).

The roadside unit 40 is an example of a base station that controls the traffic safety apparatus. The roadside unit 40 performs radio communication with the railroad vehicle 10 that travels on the railroad track 110, and also performs radio communication with the vehicle 20 and the passerby terminal 30. When the train includes a plurality of the railroad vehicles 10, the leading railroad vehicle 10 among the plurality of railroad vehicles 10 may be provided with a communication function, and the roadside unit 40 may perform radio communication with the leading railroad vehicle 10. Further, the roadside unit 40 performs communication with the railroad crossing alarm 130 and the railroad crossing gate 140 in a wired or wireless manner.

Railroad Vehicle

Figure 2:
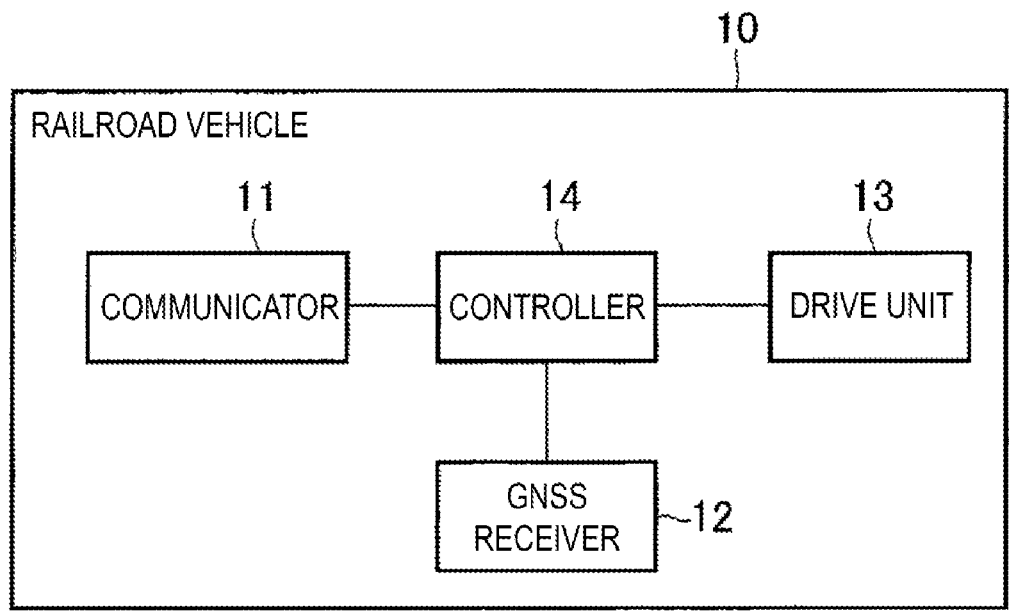
FIG. 2 is a diagram illustrating a configuration of a railroad vehicle according to the first embodiment.

FIG. 2 is a diagram illustrating a configuration of the railroad vehicle 10 according to the first embodiment. As illustrated in FIG. 2, the railroad vehicle 10 includes a communicator 11, a Global Navigation Satellite System (GNSS) receiver 12, a drive unit 13, and a controller 14.

The communicator 11 may conform to the ARIB T109 standard, or may conform to the Vehicle to Everything (V2X) standard defined in the 3rd Generation Partnership Project (3GPP). The communicator 11 may perform roadside-to-vehicle communication, or may perform vehicle-to-vehicle communication. In the V2X standard of 3GPP, the vehicle-to-vehicle communication is also referred to as sidelink communication.

The communicator 11 includes a radio communication module. The radio communication module includes an antenna, and converts a radio signal received by the antenna into a baseband signal (received signal) and outputs the baseband signal to the controller 14. The radio communication module converts a baseband signal (transmission signal) to be output by the controller 14 into a radio signal and transmits the radio signal from the antenna.

When the communicator 11 conforms to the ARIB T109 standard, the communicator 11 may have a function of performing carrier sensing to determine an available state of a radio frequency (for example, the 700 MHz band), and transmit packets at timing when the radio frequency is available. When the communicator 11 conforms to the V2X standard defined in 3GPP, the communicator 11 may transmit packets by using time and frequency allocated by a cellular base station (not illustrated). One message may include one or more packets.

The GNSS receiver 12 performs positioning, based on GNSS satellite signals, and outputs position information indicating the current geographical position (latitude and longitude) of the railroad vehicle 10, to the controller 14.

The drive unit 13 includes a motor as a source of power, a power transmission mechanism, wheels, and the like, and drives the railroad vehicle 10.

The controller 14 includes a control circuit that includes at least one memory and at least one processor electrically connected to the memory. The controller 14 controls various functions of the railroad vehicle 10.

In the first embodiment, the controller 14 generates a message M1 to be transmitted by the railroad vehicle 10 (communicator 11) according to the first embodiment. The controller 14 controls the communicator 11 so as to transmit the generated message M1 to at least either one of the roadside unit 40 or the mobile stations (the vehicle 20 and the passerby terminal 30).

Generation and transmission of the message M1 may be periodically performed, or may be performed at timing when it is determined through carrier sensing that transmission is possible or at timing according to a request from the roadside unit 40. The message M1 can be transmitted by broadcasting, group-casting (multicasting), or unicasting. The following description mainly assumes a case in which the message M1 is transmitted by broadcasting.

Figure 3:
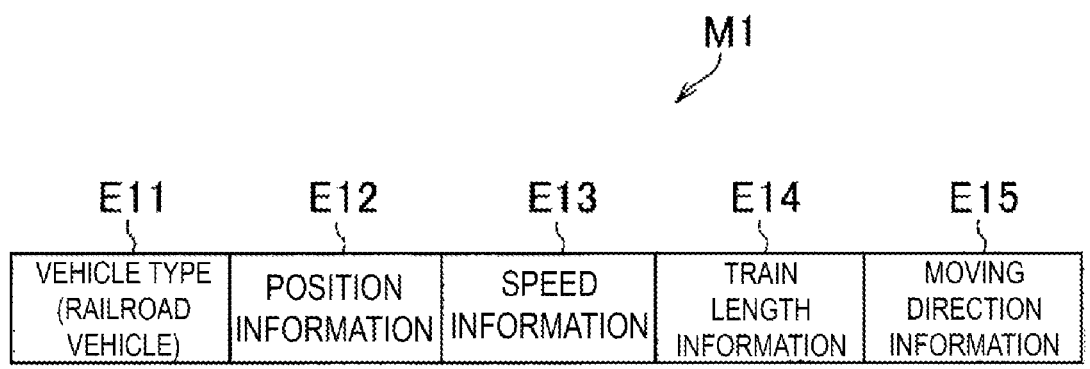
FIG. 3 is a diagram illustrating a configuration of a message transmitted by the railroad vehicle according to the first embodiment.

FIG. 3 is a diagram illustrating a configuration of the message M1. The message M1, or information elements constituting the message M may be used in a standard of ITS on which the ARIB T109 is based, the V2X standard defined in 3GPP, or the like.

As illustrated in FIG. 3, the message M1 includes an information element E11 indicating a vehicle type of a transmission source vehicle, an information element E12 indicating a position of the transmission source vehicle, an information element E13 indicating vehicle speed of the transmission source vehicle, an information element E14 indicating train length of the transmission source vehicle (train), and an information element E15 indicating a moving direction of the transmission source vehicle.

Specifically, the information element E11 is an information element indicating that the transmission source vehicle is a railroad vehicle. The information element E11 may be a 1-bit flag indicating whether or not the transmission source vehicle is a railroad vehicle.

The information element E11 may be information specifically indicating a type of the railroad vehicle (train), or the message M1 may further include such information. The type of the railroad vehicle (train) may be a type that is determined according to the length of intervals between stops, examples of which include types such as a rapid train, a semi-express train, and a local train (stop at every station). The type of the railroad vehicle (train) may be a type that is determined according to usage, examples of which include types such as a passenger-carrying train, a freight train, and a work train.

The information element E12 is GNSS position information. The GNSS position information includes latitude and longitude. The GNSS position information may further include altitude.

The information element E13 is an information element indicating speed that is calculated based on the GNSS position information or speed that is obtained from a speedometer of the railroad vehicle 10. The information element E13 may be an information element indicating acceleration in addition to speed.

The information element E14 may be a numerical value (for example, X[m]) indicating the entire length of the train including a plurality of railroad vehicles, or a numerical value indicating the number of railroad vehicles constituting the train (how many railroad vehicles are included in the train).

The information element E15 may be an information element indicating specific orientation in which the railroad vehicle (train) moves, or may be an information element indicating a rough moving direction of the railroad vehicle (train), for example, an inbound/outbound direction, or an inner/outer track.

Roadside Unit

Figure 4:
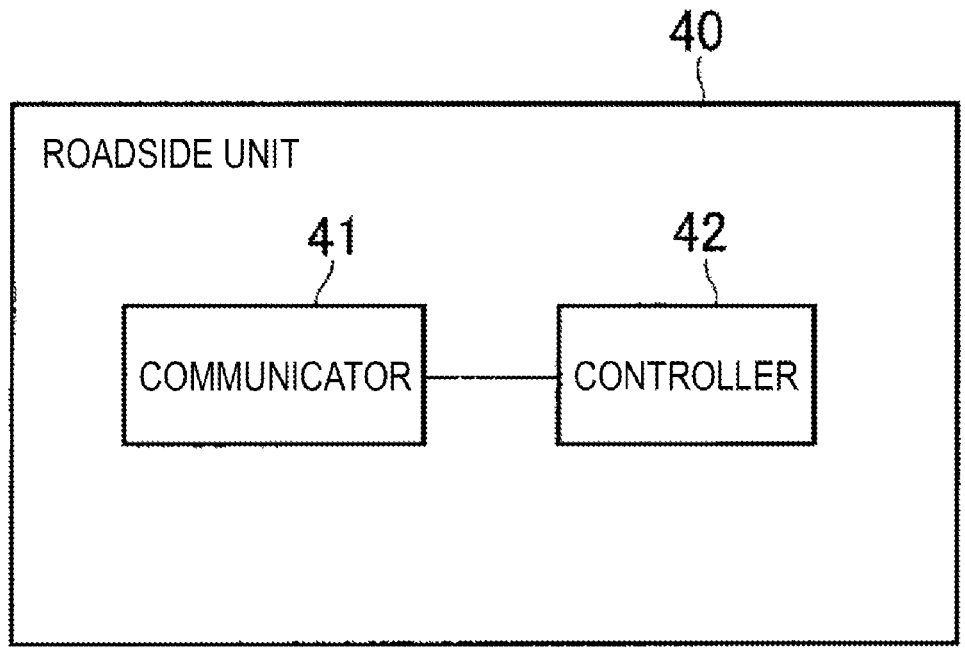
FIG. 4 is a diagram illustrating a configuration of a roadside unit according to the first embodiment.

FIG. 4 is a diagram illustrating a configuration of the roadside unit 40 according to the first embodiment. As illustrated in FIG. 4, the roadside unit 40 includes a communicator 41 and a controller 42. The roadside unit 40 may include a GNSS receiver for time synchronization. The roadside unit 40 may include a communication interface for performing communication with the railroad crossing alarm 130 and the railroad crossing gate 140.

A radio communication scheme of the roadside unit 40 may conform to the ARIB T109, the Vehicle to Everything (V2X) standard of 3GPP, and/or a radio LAN standard such as the IEEE802.11 series. The roadside unit 40 may be an all-in type capable of conforming to all of these communication standards.

The communicator 41 includes a radio communication module. The radio communication module includes an antenna, and converts a radio signal received by the antenna into a baseband signal (received signal) and outputs the baseband signal to the controller 42. The radio communication module converts a baseband signal (transmission signal) to be output by the controller 42 into a radio signal and transmits the radio signal from the antenna.

When the communicator 41 conforms to the ARIB T109 standard, the communicator 41 may have a function of performing carrier sensing to determine an available state of a radio frequency (for example, the 700 MHz band). The communicator 41 transmits packets at timing determined by the controller 42. One message may include one or more packets.

The communicator 41 may perform roadside-to-vehicle communication. Each packet includes identification information used for identification of a transmission source, synchronization information indicating a method of synchronization with the roadside unit 40, period information indicating transmission time of the packet and/or a period of roadside-to-vehicle communication (for example, the number of times of transfer in roadside-to-vehicle communication, and/or a period length of roadside-to-vehicle communication), and the like.

The communicator 41 receives the message M1 (see FIG. 3) from the railroad vehicle 10.

The controller 42 includes a control circuit that includes at least one memory and at least one processor electrically connected to the memory. The controller 42 stores in advance position information indicating a geographical position of the railroad crossing 150. As the position information of the railroad crossing 150, the position information obtained by the GNSS receiver of the roadside unit 40 may be used. The controller 42 controls various functions of the roadside unit 40.

The controller 42 may acquire train detection information from a vehicle sensor that is provided at the roadside of the railroad track 110, and detect approach of the railroad vehicle 10 to the railroad crossing 150, based on the acquired train detection information. Note that, when a communication distance of the communicator 41 is long, the approach of the railroad vehicle 10 to the railroad crossing 150 may be detected based on the message M1 received by the communicator 41. In this case, the controller 42 may detect the approach of the railroad vehicle 10 to the railroad crossing 150, based on reception of the message M1.

As the first operation, based on the message M1, the controller 42 confirms that the transmission source of the message M1 is the railroad vehicle 10 (information element E11), and checks the current position of the railroad vehicle 10 (information element E12). Here, it is assumed that the current position of the railroad vehicle 10 (information element E12) indicates a train leading position. Further, the controller 42 checks speed of the railroad vehicle 10 (information element E13). Note that, when the message M1 can be received at regular intervals, the controller 42 may calculate the speed, based on regular positions (information element E12).

The controller 42 calculates a distance between the leading position of the railroad vehicle 10 and the position of the railroad crossing 150, and calculates timing at which the railroad vehicle 10 arrives at the railroad crossing 150, based on the speed of the railroad vehicle 10. Then, the controller 42 determines that timing that is a predetermined time period earlier than the calculated arrival timing is start timing, at which prohibition of entry of the vehicle 20 and the passerby carrying the passerby terminal 30 into the railroad crossing 150 is started.

At the second operation, based on the message M1, the controller 42 calculates the rearmost position of the train that is determined according to the train length (information element E14), and calculates a distance between the rearmost position of the railroad vehicle 10 and the position of the railroad crossing 150. Then, the controller 42 calculates timing at which the rearmost part of the train including the railroad vehicles 10 passes through the railroad crossing 150, based on the speed of the railroad vehicle 10.

Then, the controller 42 determines that the calculated passing timing is lifting timing, at which the prohibition of entry of the vehicle 20 and the passerby into the railroad crossing 150 is lifted. Further, the controller 42 determines that a period from the start timing to the lifting timing is a traveling prohibition period.

Note that, in some cases, a train travels on each of the two railroad tracks 110a and 110b, and the trains moving in directions opposite to each other approach the railroad crossing 150 simultaneously. In this case, the controller 42 identifies the two trains moving toward the railroad crossing 150, based on the message M1 (in particular, the information element E15) from the respective trains. The controller 42 determines the start timing, based on the message M1 from any one of the trains that arrives at the railroad crossing 150 at an earlier time, and determines the end timing, based on the message M1 from any one of the trains that passes through the railroad crossing 150 at a later time.

As the third operation, the controller 42 generates a message M2 including an information element related to waiting time for passing of the railroad vehicle 10 through the railroad crossing 150, based on the determined start timing, end timing, and passing prohibition period. The controller 42 controls the communicator 41 so as to transmit the generated message M2 to the mobile stations (the vehicle 20 and the passerby terminal 30).

Generation and transmission of the message M2 may be periodically performed. The message can be transmitted by broadcasting, group-casting (multicasting), or unicasting. The following description mainly assumes a case in which the message M2 is transmitted by broadcasting.

As the fourth operation, the controller 42 controls the traffic safety apparatus so as to prohibit entry of the vehicle 20 and the passerby into the railroad crossing 150 at timing when approach of the railroad vehicle 10 to the railroad crossing 150 is detected or at the determined start timing. For example, the controller 42 controls the railroad crossing alarm 130 so as to start alarm operation. Further, the controller 42 controls the railroad crossing gate 140 so as to start shutting operation.

As the fifth operation, the controller 42 controls the traffic safety apparatus so as to lift the prohibition of entry of the vehicle 20 and the passerby into the railroad crossing 150 at the determined lifting timing. For example, the controller 42 controls the railroad crossing alarm 130 so as to stop the alarm operation. Further, the controller 42 controls the railroad crossing gate 140 so as to start operation of lifting the shutting state.

Figure 5:
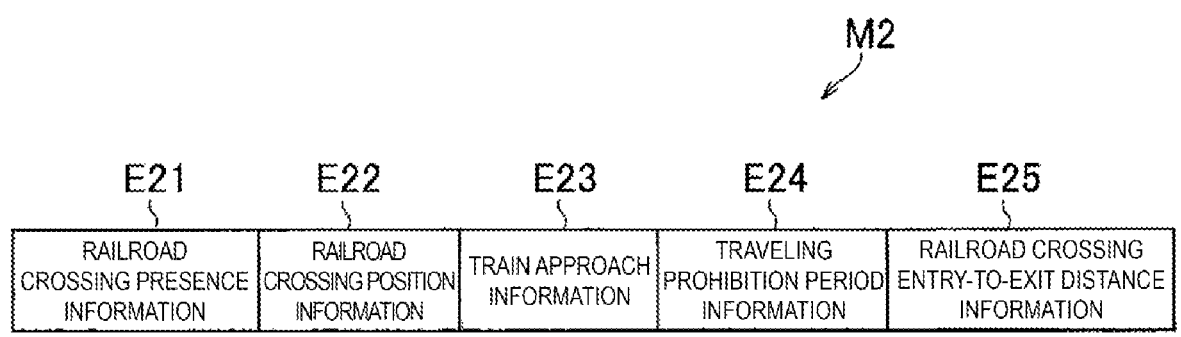
FIG. 5 is a diagram illustrating a configuration of a message transmitted by the roadside unit according to the first embodiment.

FIG. 5 is a diagram illustrating a configuration of the message M2 transmitted by the roadside unit 40 (communicator 41) according to the first embodiment. The message M2 may be a message that is transmitted and received in layer 2 or layer 3 of the OSI reference model, or may be a message that is transmitted and received in an application layer.

As illustrated in FIG. 5, the message M2 includes an information element E21 indicating that the railroad crossing 150 is present on the general road 120, an information element E22 indicating the geographical position of the railroad crossing 150, an information element E23 indicating that approach of the train to the railroad crossing 150 is detected, an information element E24 indicating a period during which traveling across the railroad crossing 150 is prohibited (specifically, a period during which one ought to wait for the train to pass through the railroad crossing), and an information element E25 indicating a distance between the entry point and the exit point of the railroad crossing 150 on the general road 120.

Specifically, the information element E21 is a 1-bit flag indicating that the railroad crossing 150 is present on the general road 120.

The information element E22 is an information element indicating the geographical position (latitude and longitude) of the railroad crossing 150. The position information may further include altitude.

The information element E23 may be a 1-bit flag indicating that approach of the train to the railroad crossing 150 is detected, an information element indicating arrival timing of the train at the railroad crossing 150, and/or an information element indicating the start timing determined by the roadside unit 40. The arrival timing or the start timing may be indicated by absolute time (for example, hour, minute, and second), and/or relative time with respect to the current timing (for example, in certain seconds from the current time).

The information element E24 may be an information element indicating duration of the traveling prohibition from the start timing (for example, how many seconds the traveling keeps being prohibited after the alarm goes off), an information element indicating the remaining time of the traveling prohibition to the end timing (for example, how many more seconds the traveling keeps being prohibited), and/or an information element indicating absolute time of the end timing (for example, hour, minute, and second).

The information element E25 may be a numerical value (for example, meters) specifically indicating the distance between the entry point and the exit point of the railroad crossing 150 on the general road 120, and/or an information element indicating whether the railroad track 110 is a single track or includes a plurality of tracks.

Vehicle

Figure 6:
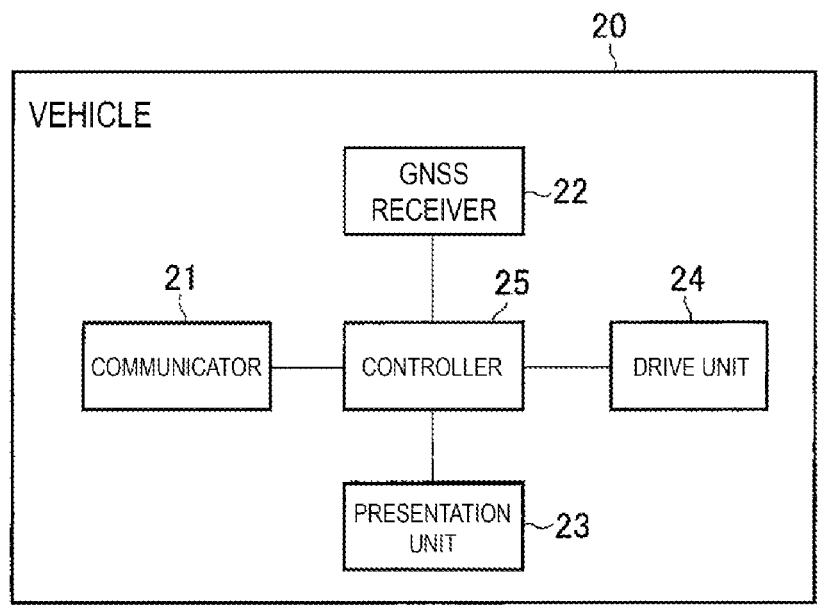
FIG. 6 is a diagram illustrating a configuration of a vehicle according to the first embodiment.

FIG. 6 is a diagram illustrating a configuration of the vehicle 20 according to the first embodiment. As illustrated in FIG. 6, the vehicle 20 includes a communicator 21, a GNSS receiver 22, a presentation unit 23, and a drive unit 24.

The communicator 21 may conform to the ARIB T109 standard, or may conform to the V2X standard of 3GPP. The communicator 21 may perform roadside-to-vehicle communication, or may perform vehicle-to-vehicle communication.

The communicator 21 includes a radio communication module. The radio communication module includes an antenna, and converts a radio signal received by the antenna into a baseband signal (received signal) and outputs the baseband signal to the controller 25. The radio communication module converts a baseband signal (transmission signal) to be output by the controller 25 into a radio signal and transmits the radio signal from the antenna.

When the communicator 21 conforms to the ARIB T109 standard, the communicator 21 may have a function of performing carrier sensing to determine an available state of a radio frequency (for example, the 700 MHz band), and transmit packets at timing when the radio frequency is available. If the communicator 21 conforms to the V2X standard defined in 3GPP, the communicator 21 may transmit and receive packets by using time and frequency allocated by a cellular base station (not illustrated). One message may include one or more packets.

The GNSS receiver 22 performs positioning, based on GNSS satellite signals, and outputs position information indicating the current geographical position (latitude and longitude) of the vehicle 20 to the controller 25.

The presentation unit 23 presents information to a driver of the vehicle 20. For example, the presentation unit 23 includes at least one of a display that displays information or a speaker that outputs information with voice.

The drive unit 24 includes an engine or a motor as a source of power, a power transmission mechanism, wheels, and the like, and drives the vehicle 20.

The controller 25 includes a control circuit that includes at least one memory and at least one processor electrically connected to the memory. The controller 25 controls various functions of the vehicle 20.

In the first embodiment, the communicator 21 receives the message M2 (see FIG. 5) from the roadside unit 40. The controller 25 controls the presentation unit 23 so as to present information corresponding to the information elements included in the message M2 to the driver. When the vehicle 20 is a vehicle capable of automated driving (full-automated driving or semi-automated driving), the controller 25 may control the drive unit 24 so as to perform driving according to the information elements included in the message M2.

For example, the controller 25 presents information indicating that the railroad crossing 150 is present in a moving direction of the vehicle 20, by using the presentation unit 23, based on the information element E21 and the information element E22 and the position information obtained by the GNSS receiver 22. In this case, the controller 25 may also present the distance between the vehicle 20 and the railroad crossing 150 by using the presentation unit 23. Further, the controller 25 may control the drive unit 24 so as to decelerate the vehicle 20.

The controller 25 presents information of at least one of the information that approach of the train to the railroad crossing 150 is detected, the arrival timing of the train at the railroad crossing 150, or the start timing of the traveling prohibition, by using the presentation unit 23, based on the information element E23. Further, the controller 25 may control the drive unit 24 so as to stop the vehicle 20.

The controller 25 presents information of at least one of the duration of the traveling prohibition from the start timing, the remaining time of the traveling prohibition to the end timing of the traveling prohibition, or the absolute time of the end timing of the traveling prohibition, by using the presentation unit 23, based on the information element E24. Further, the controller 25 may control the drive unit 24 so as to maintain stopping of the vehicle 20 until the end timing of the traveling prohibition, and enable restart of moving of the vehicle 20 at the end timing.

The controller 25 presents information of at least one of the distance between the entry point and the exit point of the railroad crossing 150 on the general road 120 or the information indicating whether the railroad track 110 is a single track or includes a plurality of tracks, by using the presentation unit 23, based on the information element E25. Further, the controller 25 may control the drive unit 24 so as to reduce the speed between the entry point and the exit point of the railroad crossing 150.

Passerby Terminal

Figure 7:
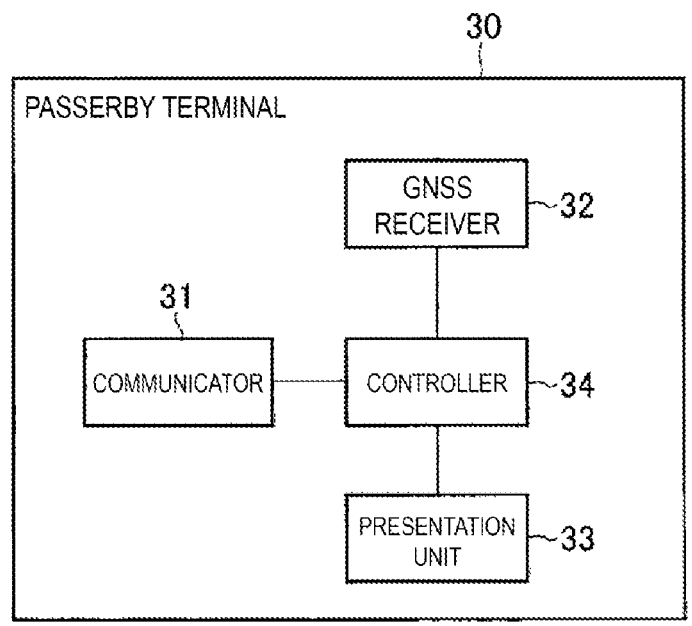
FIG. 7 is a diagram illustrating a configuration of a passerby terminal according to the first embodiment.

FIG. 7 is a diagram illustrating a configuration of the passerby terminal 30 according to the first embodiment. As illustrated in FIG. 7, the passerby terminal 30 includes a communicator 31, a GNSS receiver 32, and a presentation unit 33.

The communicator 31 may conform to the ARIB T109 standard, the V2X standard of 3GPP, and/or the radio LAN standard. The communicator 31 includes a radio communication module. The radio communication module includes an antenna, and converts a radio signal received by the antenna into a baseband signal (received signal) and outputs the baseband signal to the controller 25. The radio communication module converts a baseband signal (transmission signal) to be output by the controller 25 into a radio signal and transmits the radio signal from the antenna.

When the communicator 31 conforms to the ARIB T109 standard, the communicator 31 may have a function of performing carrier sensing to determine an available state of a radio frequency (for example, the 700 MHz band), and transmit packets at timing when the radio frequency is available. If the communicator 31 conforms to the V2X standard defined in 3GPP, the communicator 31 may transmit and receive packets by using time and frequency allocated by a cellular base station (not illustrated). One message may include one or more packets.

The GNSS receiver 32 performs positioning, based on GNSS satellite signals, and outputs position information indicating the current geographical position (latitude and longitude) of the passerby terminal 30, to the controller 25.

The presentation unit 33 presents information to the passerby carrying the passerby terminal 30. For example, the presentation unit 33 includes at least one of a display that displays information or a speaker that outputs information with voice.

The controller 25 includes a control circuit that includes at least one memory and at least one processor electrically connected to the memory. The controller 25 controls various functions of the passerby terminal 30.

In the first embodiment, the communicator 31 receives the message M2 (see FIG. 5) from the roadside unit 40. The controller 25 controls the presentation unit 33 so as to present information corresponding to the information elements included in the message M2 to the driver.

For example, the controller 25 presents information indicating that the railroad crossing 150 is present in a moving direction of the passerby terminal 30, by using the presentation unit 33, based on the information element E21 and the information element E22 and the position information obtained by the GNSS receiver 32. In this case, the controller 25 may also present the distance between the passerby terminal 30 and the railroad crossing 150 by using the presentation unit 33.

The controller 25 presents information of at least one of the information that approach of a train to the railroad crossing 150 is detected, the arrival timing of the train at the railroad crossing 150, or the start timing of the traveling prohibition, by using the presentation unit 33, based on the information element E23.

The controller 25 presents information of at least one of the duration of the traveling prohibition from the start timing, the remaining time of the traveling prohibition to the end timing of the traveling prohibition, or the absolute time of the end timing of the traveling prohibition, by using the presentation unit 33, based on the information element E24.

The controller 25 presents information of at least one of the distance between the entry point and the exit point of the railroad crossing 150 on the general road 120 or the information indicating whether the railroad track 110 is a single track or includes a plurality of tracks, by using the presentation unit 33, based on the information element E25.

Operation Sequence Example

Figure 8:
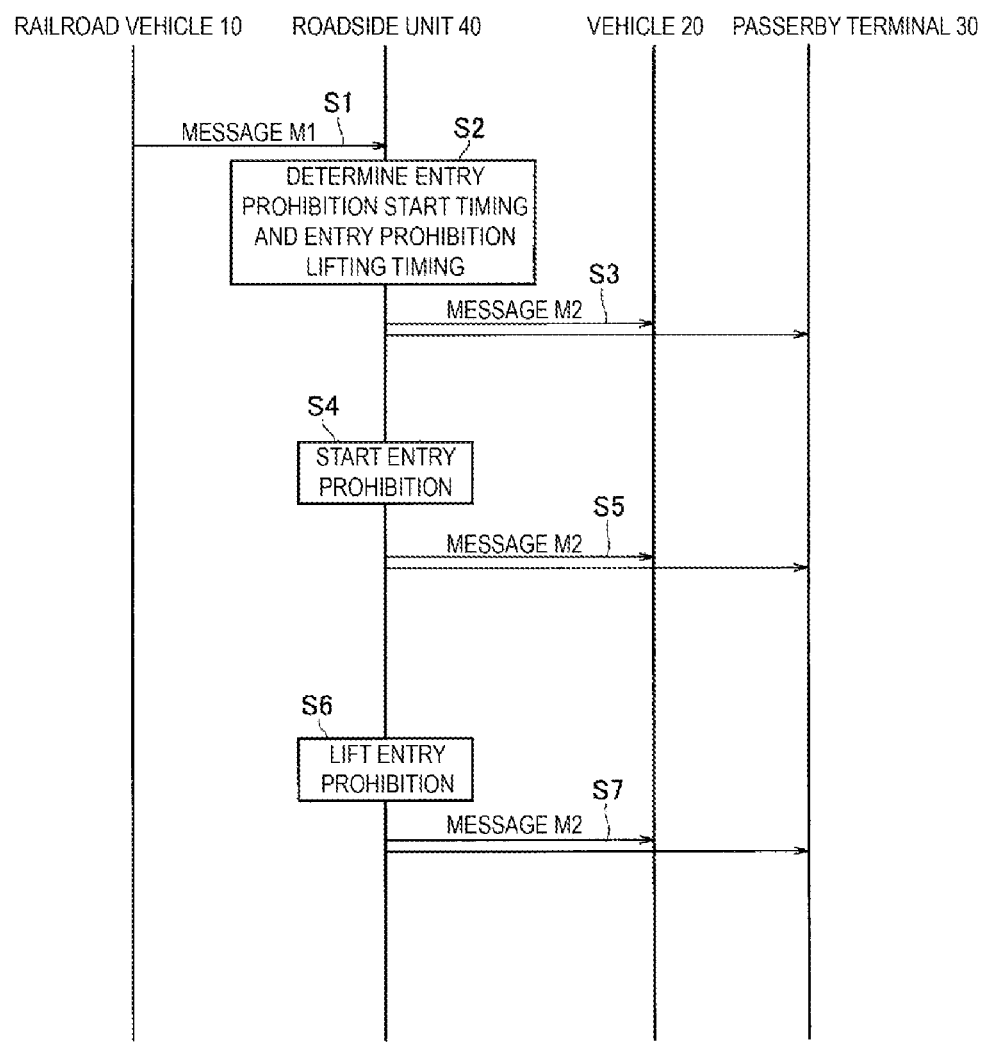
FIG. 8 is a diagram illustrating an operation sequence example of the traffic communication system according to the first embodiment.

FIG. 8 is a diagram illustrating an operation sequence example of the traffic communication system according to the first embodiment.

As illustrated in FIG. 8, in Step S1, the railroad vehicle 10 transmits the message M1 to the roadside unit 40.

In Step S2, the roadside unit 40 determines the start timing at which prohibition of entry of the vehicle 20 and the passerby into the railroad crossing 150 is started and the lifting timing at which the entry prohibition is lifted, based on the message M1 received from the railroad vehicle 10.

In Step S3, the roadside unit 40 transmits the message M2 based on results of Step S2 to the mobile stations (the vehicle 20 and the passerby terminal 30).

In Step S4, the roadside unit 40 controls the railroad crossing alarm 130 and the railroad crossing gate 140 so as to start the prohibition of entry of the vehicle 20 and the passerby into the railroad crossing 150 at the start timing determined in Step S3.

In Step S5, the roadside unit 40 transmits the message M2 to the mobile stations (the vehicle 20 and the passerby terminal 30). Here, the roadside unit 40 may include the remaining time during which the entry prohibition state is maintained in the message M2.

In Step S6, the roadside unit 40 controls the railroad crossing alarm 130 and the railroad crossing gate 140 so as to lift the prohibition of entry of the vehicle 20 and the passerby into the railroad crossing 150 at the end timing determined in Step S3.

In Step S7, the roadside unit 40 transmits the message M2 to the mobile stations (the vehicle 20 and the passerby terminal 30). Here, the transmitted message M2 need not include the information element indicating approach of the train to the railroad crossing 150.

Modification Example of First Embodiment

Figure 9:
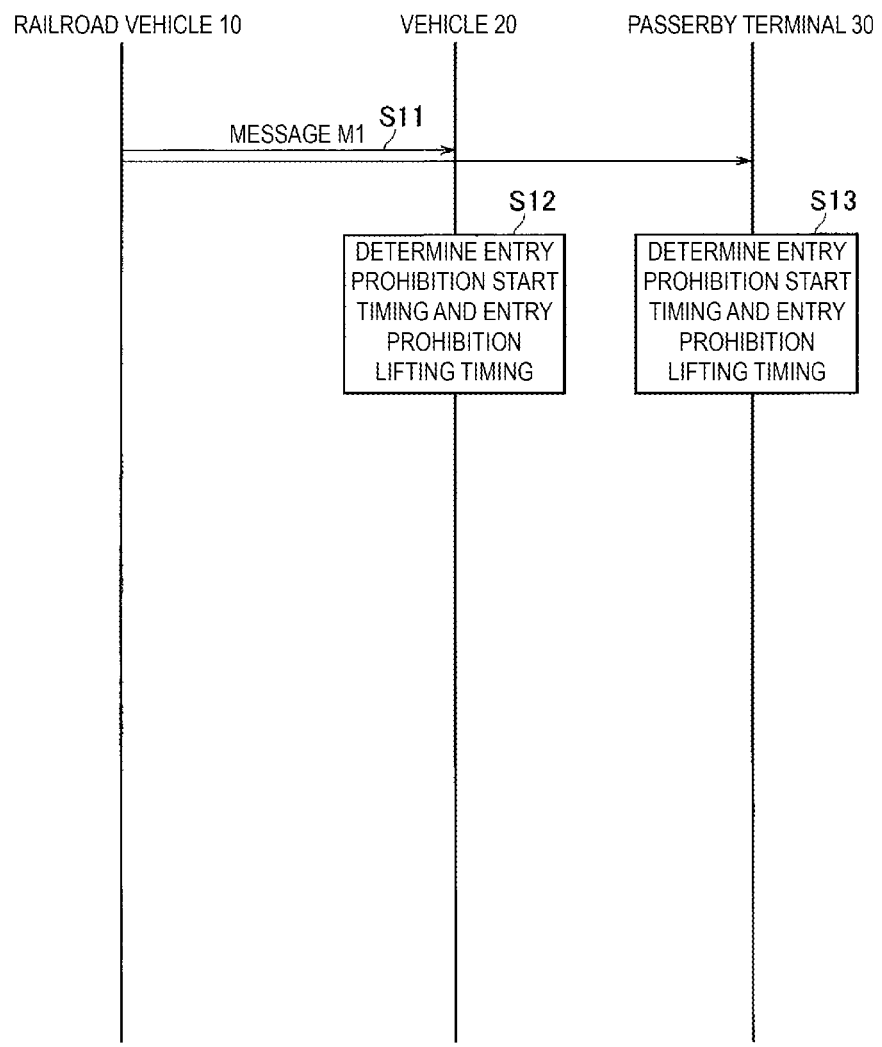
FIG. 9 is a diagram illustrating an operation sequence example of the traffic communication system according to a modification example of the first embodiment.

The mobile stations (the vehicle 20 and the passerby terminal 30) may receive the message M1 transmitted from the railroad vehicle 10. FIG. 9 is a diagram illustrating an operation sequence example of the traffic communication system according to a modification example of the first embodiment. As illustrated in FIG. 9, in Step S11, the railroad vehicle 10 transmits the message M1 to the vehicle 20 and the passerby terminal 30. In Steps S12 and S13, each of the vehicle 20 and the passerby terminal 30 determines the start timing at which prohibition of entry of the mobile station into the railroad crossing 150 is started and the lifting timing at which the entry prohibition is lifted, through operation similar to the operation of the roadside unit 40 described above. Then, each of the vehicle 20 and the passerby terminal 30 performs presentation control and the like, similar to those of the embodiment described above, based on the determined start timing and lifting timing.

The first embodiment described above provides description of the railroad vehicle 10, the vehicle 20, and the roadside unit 40. However, a communication apparatus (communication module) provided in at least any one of the railroad vehicle 10, the vehicle 20, or the roadside unit 40 may be provided.

Second Embodiment

A second embodiment will be described with reference to the drawings. Note that, in the following description regarding the drawings, the same or similar parts are denoted by the same or similar reference signs. The difference of the second embodiment from the first embodiment will mainly be described.

Traffic Communication System

The figure illustrating a first configuration example of the traffic communication system according to the second embodiment is similar to FIG. 1 illustrating the configuration of the traffic communication system according to the first embodiment. Thus, in the following description, the first configuration example of the traffic communication system according to the second embodiment will be described with reference to FIG. 1.

As illustrated in FIG. 1, the traffic communication system according to the second embodiment includes a railroad track 110 on which a railroad vehicle 10 travels, and a general road 120 on which a vehicle 20 and a passerby terminal 30 travel, and the railroad track 110 and the general road 120 intersect at a railroad crossing 150. A roadside unit 40 is installed in the vicinity of the railroad crossing 150.

The railroad vehicle 10 is an example of a specific vehicle that is given priority over the mobile stations (the vehicle 20 and the passerby terminal 30) that travel on the general road 120. A train includes a plurality of the railroad vehicles 10 (10a, 10b, . . . ) being coupled together. The second embodiment describes an example in which the specific vehicle is the railroad vehicle 10. However, the specific vehicle may be any vehicle (for example, a bus) that belongs to public transportation, an automated driving vehicle, or the like.

The railroad track 110 is an example of the dedicated road on which the specific vehicle travels. FIG. 1 illustrates a plurality of the railroad tracks 110 including two railroad tracks 110a and 110b. However, the railroad track 110 may be a single-track railroad track which includes only one railroad track. A train including a plurality of the railroad vehicles 10 (railroad vehicles 10a, 10b, . . . ) moves on the railroad track 110a toward the railroad crossing 150.

The vehicle 20 is an example of a mobile station that travels on the general road 120. FIG. 1 illustrates an example of a four-wheeled motor vehicle as the vehicle 20. However, the vehicle 20 may be a two-wheeled motor vehicle, a three-wheeled motor vehicle, or the like. Further, FIG. 1 illustrates an example of two vehicles 20 (20a and 20b). However, the number of the vehicles 20 may be three or more.

The passerby terminal 30 is another example of a mobile station that travels on the general road 120. The passerby terminal 30 may be any sort of terminal as long as the passerby terminal 30 is a terminal of the passerby. Examples of the passerby terminal 30 include a smartphone, a tablet terminal, and a wearable terminal.

Note that, regarding a bicycle, when a communication apparatus mounted on a bicycle is used, the bicycle may be classified as the vehicle 20, whereas when a terminal carried by a driver of a bicycle is used, the terminal may be classified as the passerby terminal 30.

The general road 120 is a road on which an automobile, a bicycle, a pedestrian, and the like travel. FIG. 1 illustrates an example of the two-lane general road 120 including two traffic lanes 120*a* and 120*b*. However, the general road 120 may be a one-way road including only one traffic lane, or may be a road including three or more traffic lanes. Further, the general road 120 includes a roadside pedestrian walkway 120*c* on which the passerby (passerby terminal 30) travels.

The railroad crossing 150 is an example of an intersection at which the general road and the dedicated road intersect (specifically, at-grade intersection). The railroad crossing 150 may be referred to as a railroad crossing road. At the railroad crossing 150, a traffic safety apparatus is provided.

The traffic safety apparatus provided at the railroad crossing 150 may be referred to as railroad crossing safety equipment. FIG. 1 illustrates an example in which railroad crossing alarms 130 (130*a* and 130*b*) and railroad crossing gates 140 (140*a* and 140*b*) are provided as the traffic safety apparatus. However, the railroad crossing gates 140 need not necessarily be provided.

The railroad crossing alarm 130 is an apparatus for informing passersby, vehicle drivers, and the like traveling on the general road 120 of the presence of the railroad crossing 150, and, when the train approaches, issuing an alarm with sound and light to stop road traffic.

The railroad crossing gate 140 is an apparatus for restricting traveling on the general road 120 in order to let the train travel preferentially. The railroad crossing gate 140 includes a gate bar and a mechanical unit for raising and lowering the gate bar.

The roadside unit 40 is an example of a base station that controls the traffic safety apparatus. The roadside unit 40 performs radio communication with the railroad vehicle 10 that travels on the railroad track 110, and also performs radio communication with the mobile stations (the vehicle 20 and the passerby terminal 30) that travel on the general road 120. When the train includes a plurality of the railroad vehicles 10, the leading railroad vehicle 10 among the plurality of railroad vehicles 10 may be provided with a communication function, and the roadside unit 40 may perform radio communication with the leading railroad vehicle 10. Further, the roadside unit 40 performs communication with the railroad crossing alarm 130 and the railroad crossing gate 140 in a wired or wireless manner.

Figure 10:
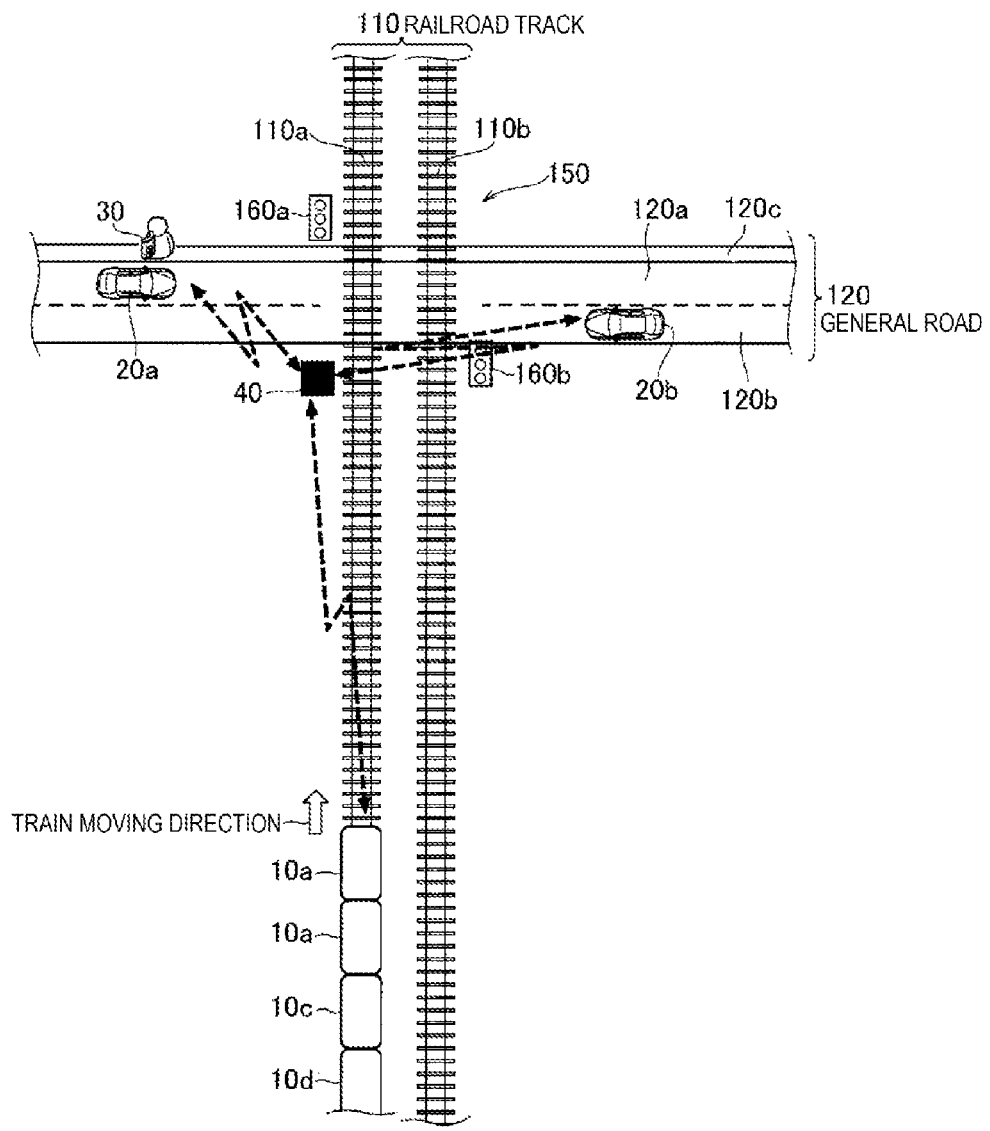
FIG. 10 is a diagram illustrating a second configuration example of a traffic communication system according to a second embodiment.

FIG. 10 is a diagram illustrating a second configuration example of the traffic communication system according to the second embodiment.

As illustrated in FIG. 10, in the second configuration example, the traffic safety apparatus provided at the railroad crossing 150 includes a traffic light 160 for the general road 120, instead of the railroad crossing alarm 130 and the railroad crossing gate 140.

The traffic light 160 is an apparatus that indicates signals for permission to proceed and instruction to stop, in order to secure traffic safety in the general road 120 or to achieve smooth traffic flow. FIG. 10 illustrates an example of a traffic light 160*a* that is provided on the side of one traffic lane 120*a* of the general road 120 and a traffic light 160*b* that is provided on the side of another traffic lane 120*b* of the general road 120. The roadside unit 40 controls each traffic light 160 by performing communication with the traffic light 160 in a wired or wireless manner.

The Road Traffic Act (date of enforcement: Apr. 1, 2018), Article 33, paragraph (1), stipulates the following: "Before going over a railroad crossing, the driver of a vehicle or streetcar must stop immediately in front of the railroad crossing (or immediately in front of any stop line established by road signs or markings; the same applies hereinafter in this paragraph) and must not proceed until after checking that it is safe to do so; provided, however, that the vehicle or streetcar may proceed without stopping immediately before a railroad crossing when complying with a signal indicated by a traffic light."

Accordingly, in the configuration example 2, when the traffic light 160 indicates a signal for permission to proceed, the vehicle 20 is not required to momentarily stop before entering the railroad crossing 150. In contrast, in the configuration example 1 illustrated in FIG. 1, even when the railroad crossing alarm 130 and the railroad crossing gate 140 do not operate (specifically, even when the railroad vehicle 10 does not approach the railroad crossing 150), the vehicle 20 is required to momentarily stop before entering the railroad crossing 150.

Railroad Vehicle

The figure illustrating a configuration of the railroad vehicle 10 according to the second embodiment is similar to FIG. 2 illustrating the configuration of the railroad vehicle according to the first embodiment. Thus, in the following description, the configuration of the railroad vehicle 10 according to the second embodiment will be described with reference to FIG. 2. As illustrated in FIG. 2, the railroad vehicle 10 includes a communicator 11, a Global Navigation Satellite System (GNSS) receiver 12, a drive unit 13, and a controller 14.

The communicator 11 may conform to the ARIB T109 standard, or may conform to the Vehicle to Everything (V2X) standard defined in the 3rd Generation Partnership Project (3GPP). The communicator 11 may perform roadside-to-vehicle communication, or may perform vehicle-to-vehicle communication. In the V2X standard of 3GPP, the vehicle-to-vehicle communication is also referred to as sidelink communication.

The communicator 11 includes a radio communication module. The radio communication module includes an antenna, and converts a radio signal received by the antenna into a baseband signal (received signal) and outputs the baseband signal to the controller 14. The radio communication module converts a baseband signal (transmission signal) to be output by the controller 14 into a radio signal and transmits the radio signal from the antenna.

The communicator 11 may have a function of performing carrier sensing to determine an available state of a radio frequency (for example, the 700 MHz band), and transmit packets at timing when the radio frequency is available. The communicator 11 may transmit packets by using time and frequency allocated by a cellular base station (not illustrated). One message may include one or more packets.

The GNSS receiver 12 performs positioning, based on GNSS satellite signals, and outputs position information indicating the current geographical position (latitude and longitude) of the railroad vehicle 10, to the controller 14.

The drive unit 13 includes a motor as a source of power, a power transmission mechanism, wheels, and the like, and drives the railroad vehicle 10.

The controller 14 includes a control circuit that includes at least one memory and at least one processor electrically connected to the memory. The controller 14 controls various functions of the railroad vehicle 10.

In the second embodiment, the controller 14 generates a message M3. The controller 14 controls the communicator 11 so as to transmit the generated message M3 to at least either one of the roadside unit 40 or the mobile stations (the vehicle 20 and the passerby terminal 30).

Generation and transmission of the message M3 may be periodically performed, or may be performed at timing when it is determined through carrier sensing that transmission is possible or at timing according to a request from the roadside unit 40. The message M3 can be transmitted by broadcasting, group-casting (multicasting), or unicasting. The following description mainly assumes a case in which the message M3 is transmitted by broadcasting.

Figure 11:
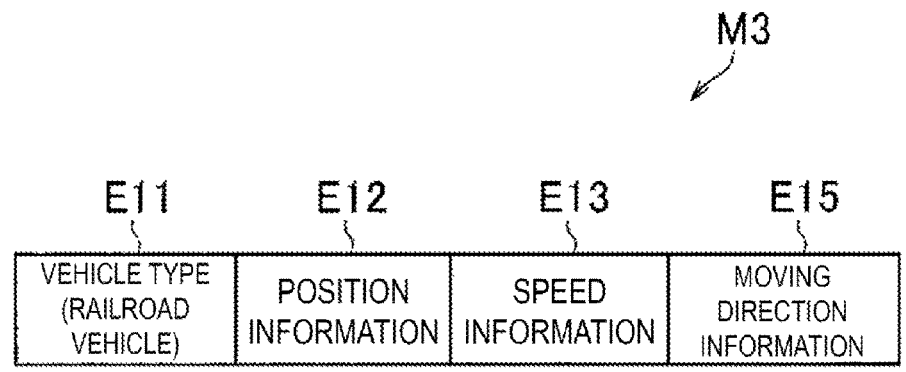
FIG. 11 is a diagram illustrating a configuration of a message transmitted by a railroad vehicle according to the second embodiment.

FIG. 11 is a diagram illustrating a configuration of the message M3 transmitted by the railroad vehicle 10 (communicator 11) according to the second embodiment. The message M3 may be a message that is transmitted and received in layer 2 or layer 3 of the OSI reference model, or may be a message that is transmitted and received in an application layer.

As illustrated in FIG. 11, the message M3 includes an information element E11 indicating a vehicle type of a transmission source vehicle, an information element E12 indicating a position of the transmission source vehicle, an information element E13 indicating vehicle speed of the transmission source vehicle, and an information element E15 indicating a moving direction of the transmission source vehicle.

Specifically, the information element E11 is an information element indicating that the transmission source vehicle is a railroad vehicle. The information element E11 may be a 1-bit flag indicating whether or not the transmission source vehicle is a railroad vehicle.

The information element E11 may be information specifically indicating a type of the railroad vehicle (train), or the message M3 may further include such information. The type of the railroad vehicle (train) may be a type that is determined according to the length of intervals between stops, examples of which include types such as a rapid train, a semi-express train, and a local train (stop at every station). The type of the railroad vehicle (train) may be a type that is determined according to usage, examples of which include types such as a passenger-carrying train, a freight train, and a work train.

The information element E12 is GNSS position information. The GNSS position information includes latitude and longitude. The GNSS position information may further include altitude.

The information element E13 is an information element indicating speed that is calculated based on the GNSS position information or speed that is obtained from a speedometer of the railroad vehicle 10. The information element E13 may be an information element indicating acceleration in addition to speed.

The information element E15 may be an information element indicating specific orientation in which the railroad vehicle (train) moves, or may be an information element indicating a rough moving direction of the railroad vehicle (train), for example, an inbound/outbound direction, or an inner/outer track.

Roadside Unit

The figure illustrating a configuration of the roadside unit 40 according to the second embodiment is similar to FIG. 4 illustrating the configuration of the roadside unit 40 according to the first embodiment. Thus, in the following description, the configuration of the roadside unit 40 according to the second embodiment will be described with reference to FIG. 4. As illustrated in FIG. 4, the roadside unit 40 includes a communicator 41 and a controller 42. The roadside unit 40 may include a GNSS receiver for time synchronization. The roadside unit 40 may include a communication interface for performing communication with the railroad crossing alarm 130 and the railroad crossing gate 140, or a communication interface for performing communication with the traffic light 160. The roadside unit 40 may include a communication interface for communicating with an operation management system of the railroad vehicle 10. The operation management system includes, for example, a train operation management system (commonly referred to as Programed Traffic Control (PTC)).

A radio communication scheme of the roadside unit 40 may conform to the ARIB T109, the Vehicle to Everything (V2X) standard of 3GPP, and/or a radio LAN standard such as the IEEE802.11 series. The roadside unit 40 may be an all-in type capable of conforming to all of these communication standards. Note that, for communication with the operation management system, the radio communication scheme of the roadside unit 40 may conform to a standard other than the V2X standard of 3GPP. Further, for communication with the operation management system, the roadside unit 40 may support a wired communication scheme.

The communicator 41 includes a radio communication module. The radio communication module includes an antenna, and converts a radio signal received by the antenna into a baseband signal (received signal) and outputs the baseband signal to the controller 42. The radio communication module converts a baseband signal (transmission signal) to be output by the controller 42 into a radio signal and transmits the radio signal from the antenna.

The communicator 41 may have a function of performing carrier sensing to determine an available state of a radio frequency (for example, the 700 MHz band). The communicator 41 transmits packets at timing determined by the controller 42. One message may include one or more packets.

The communicator 41 may perform roadside-to-vehicle communication. Each packet includes identification information used for identification of a transmission source, synchronization information indicating a method of synchronization with the roadside unit 40, period information indicating transmission time of the packet and/or a period of roadside-to-vehicle communication (for example, the number of times of transfer in the roadside-to-vehicle communication, and/or a period length of the roadside-to-vehicle communication), and the like.

The communicator 41 receives the message M3 (see FIG. 11) from the railroad vehicle 10.

The controller 42 includes a control circuit that includes at least one memory and at least one processor electrically connected to the memory. The controller 42 stores in advance position information indicating a geographical position of the railroad crossing 150. As the position information of the railroad crossing 150, the position information obtained by the GNSS receiver of the roadside unit 40 may be used. The controller 42 controls various functions of the roadside unit 40.

The controller 42 may acquire train detection information from a vehicle sensor that is provided at the roadside of the railroad track 110, and detect approach of the railroad vehicle 10 to the railroad crossing 150, based on the acquired train detection information. Note that, when a communication distance of the communicator 41 is long, the approach of the railroad vehicle 10 to the railroad crossing 150 may be detected based on the message M3 received by the communicator 41. In this case, the controller 42 may detect the approach of the railroad vehicle 10 to the railroad crossing 150, based on reception of the message M3.

As the first operation, based on the message M3, the controller 42 confirms that the transmission source of the message M3 is the railroad vehicle 10 (information element E11), and checks the current position of the railroad vehicle 10 (information element E12). Here, it is assumed that the current position of the railroad vehicle 10 (information element E12) indicates a train leading position. Further, the controller 42 checks speed of the railroad vehicle 10 (information element E13). Note that, when the message M3 can be received at regular intervals, the controller 42 may calculate the speed, based on regular positions (information element E12).

The controller 42 calculates a distance between the leading position of the railroad vehicle 10 and the position of the railroad crossing 150, and calculates timing at which the railroad vehicle 10 arrives at the railroad crossing 150, based on the speed of the railroad vehicle 10. Then, the controller 42 determines that timing that is a predetermined time period earlier than the calculated arrival timing is start timing, at which prohibition of entry of the mobile stations (the vehicle 20 and the passerby terminal 30) into the railroad crossing 150 is started.

As the second operation, the controller 42 controls the traffic safety apparatus so as to prohibit entry of the mobile stations (the vehicle 20 and the passerby terminal 30) into the railroad crossing 150 at timing when approach of the railroad vehicle 10 to the railroad crossing 150 is detected or at the determined start timing. For example, the controller 42 controls the railroad crossing alarm 130 so as to start alarm operation, and also controls the railroad crossing gate 140 so as to start shutting operation (case of the configuration example 1). Alternatively, the controller 42 controls the traffic light 160 so as to indicate a stop signal (case of the configuration example 2).

As the third operation, the controller 42 detects that the railroad vehicle 10 has passed through the railroad crossing 150, based on the message M3. The controller 42 may detect that the railroad vehicle 10 has passed through the railroad crossing 150, based on the fact that the distance between the current position of the railroad vehicle 10 (information element E12) and the position of the railroad crossing 150 exceeds a threshold, or the fact that the message M3 can no longer be received from the railroad vehicle 10.

As the fourth operation, when the controller 42 detects that the railroad vehicle 10 has passed through the railroad crossing 150, the controller 42 controls the traffic safety apparatus so as to lift the prohibition of entry of the mobile stations (the vehicle 20 and the passerby terminal 30) into the railroad crossing 150. For example, the controller 42 controls the railroad crossing alarm 130 so as to stop the alarm operation, and also controls the railroad crossing gate 140 so as to start operation of lifting the shutting state (case of the configuration example 1). Alternatively, the controller 42 controls the traffic light 160 so as to indicate a proceed signal (signal for permission to proceed) (case of the configuration example 2).

Note that, when the roadside unit 40 receives the message M3, the controller 42 may transmit a message indicating that the roadside unit 40 has received the message M3 to the operation management system by radio. The message indicating that the roadside unit 40 has received the message M3 may include at least one of an identifier of the roadside unit 40, at least one of the information elements constituting the message M3, time at which the message M3 is received, or strength of communication radio waves when the message M3 is received. By receiving the message indicating that the roadside unit 40 has received the message M3, the operation management system can easily confirm whether or not the roadside unit 40 or the traffic communication system including the roadside unit 40 functions normally.

Further, the controller 42 generates a message M4, and controls the communicator 41 so as to transmit the generated message M4 to the mobile stations (the vehicle 20 and the passerby terminal 30). Generation and transmission of the message M4 may be periodically performed. The message can be transmitted by broadcasting, group-casting (multicasting), or unicasting. The following description mainly assumes a case in which the message M4 is transmitted by broadcasting.

Figure 12:
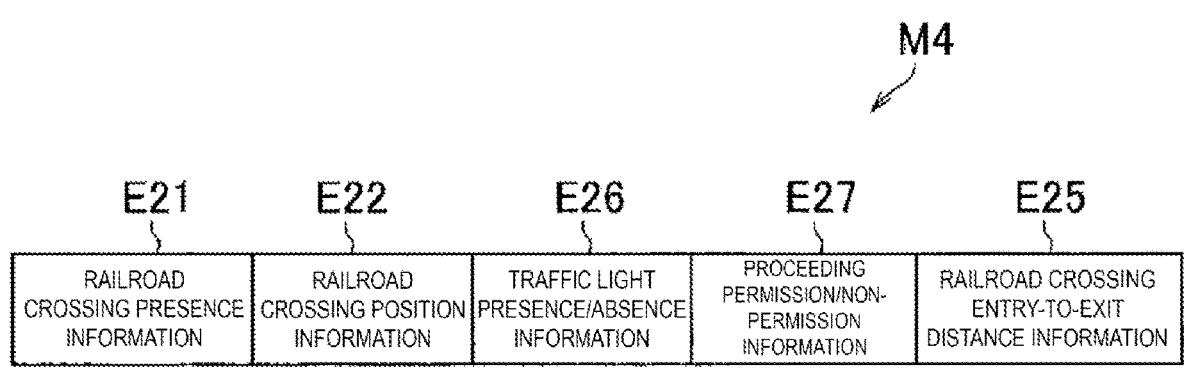
FIG. 12 is a diagram illustrating a configuration of a message transmitted by a roadside unit according to the second embodiment.

FIG. 12 is a diagram illustrating a configuration of the message M4 transmitted by the roadside unit 40 (communicator 41) according to the second embodiment. The message M4 may be a message that is transmitted and received in layer 2 or layer 3 of the OSI reference model, or may be a message that is transmitted and received in an application layer.

As illustrated in FIG. 12, the message M4 includes an information element E21 indicating that the railroad crossing 150 is present on the general road 120, an information element E22 indicating the geographical position of the railroad crossing 150, an information element E26 indicating whether or not the traffic light 160 is present on the railroad crossing 150, an information element E27 indicating whether or not entry into the railroad crossing 150 is permitted (specifically, whether or not approach of the railroad vehicle 10 to the railroad crossing 150 is detected), and an information element E25 indicating a distance between the entry point and the exit point of the railroad crossing 150 on the general road 120.

Specifically, the information element E21 may be a 1-bit flag indicating that the railroad crossing 150 is present on the general road 120.

The information element E22 is an information element indicating the geographical position (latitude and longitude) of the railroad crossing 150. The position information may further include altitude. When a stop line with a road sign or the like is provided in front of the railroad crossing 150, the information element E22 may include information indicating the position of the stop line.

The information element E26 may be a flag in which "1" is set when the traffic light 160 is present on the railroad crossing 150. The information element E26 may be an information element for specifically identifying a type of the traffic safety apparatus provided at the railroad crossing 150. For example, the information element E26 may be an information element that indicates "0" when only the railroad crossing alarm 130 is provided, indicates "1" when both of the railroad crossing alarm 130 and the railroad crossing gate 140 are provided, and indicates "2" when only the traffic light 160 is provided.

The information element E27 may be information that indicates "0" when entry into the railroad crossing 150 is prohibited, and indicates "1" when the entry is permitted. A method of interpreting the information element E27 may vary according to the details of the information element E26. For example, a case in which the information element E26 indicates that the railroad crossing alarm 130 is provided and the information element E27 indicates entry prohibition into the railroad crossing 150 may mean that the railroad crossing alarm 130 performs alarm operation. Further, a case in which the information element E26 indicates that the traffic light 160 is provided and the information element E27 indicates entry prohibition into the railroad crossing 150 may mean that the traffic light 160 indicates a stop signal.

The information element E25 may be a numerical value (for example, meters) specifically indicating the distance between the entry point and the exit point of the railroad crossing 150 on the general road 120, or may be an information element indicating whether the railroad track 110 is a single track or includes a plurality of tracks.

Vehicle

The figure illustrating a configuration of the vehicle 20 according to the second embodiment is similar to FIG. 6 illustrating the configuration of the vehicle 20 according to the first embodiment. Thus, in the following description, the configuration of the vehicle 20 according to the second embodiment will be described with reference to FIG. 6. As illustrated in FIG. 6, the vehicle 20 includes a communicator 21, a GNSS receiver 22, a presentation unit 23, and a drive unit 24.

The communicator 21 may conform to the ARIB T109 standard, or may conform to the V2X standard of 3GPP. The communicator 21 may perform roadside-to-vehicle communication, or may perform vehicle-to-vehicle communication.

The communicator 21 includes a radio communication module. The radio communication module includes an antenna, and converts a radio signal received by the antenna into a baseband signal (received signal) and outputs the baseband signal to the controller 25. The radio communication module converts a baseband signal (transmission signal) to be output by the controller 25 into a radio signal and transmits the radio signal from the antenna.

The communicator 21 may have a function of performing carrier sensing to determine an available state of a radio frequency (for example, the 700 MHz band), and transmit packets at timing when the radio frequency is available. The communicator 21 may transmit and receive packets by using time and frequency allocated by a cellular base station (not illustrated). One message may include one or more packets.

The GNSS receiver 22 performs positioning, based on GNSS satellite signals, and outputs position information indicating the current geographical position (latitude and longitude) of the vehicle 20 to the controller 25.

The presentation unit 23 presents information to a driver of the vehicle 20. For example, the presentation unit 23 includes at least one of a display that displays information or a speaker that outputs information with voice.

The drive unit 24 includes an engine or a motor as a source of power, a power transmission mechanism, a braking mechanism, wheels, and the like, and drives the vehicle 20.

The controller 25 includes a control circuit that includes at least one memory and at least one processor electrically connected to the memory. The controller 25 controls various functions of the vehicle 20.

In the second embodiment, the communicator 21 receives the message M4 (see FIG. 12) from the roadside unit 40. The controller 25 controls the presentation unit 23 so as to present information corresponding to the information elements included in the message M4 to the driver. When the vehicle 20 is a vehicle capable of automated driving (full-automated driving or semi-automated driving), the controller 25 may control the drive unit 24 so as to perform driving according to the information elements included in the message M4.

For example, the controller 25 presents information indicating that the railroad crossing 150 is present in a moving direction of the vehicle 20, by using the presentation unit 23, based on the information element E21 and the information element E22 and the position information obtained by the GNSS receiver 22. In this case, the controller 25 may also present the distance between the vehicle 20 and the railroad crossing 150 by using the presentation unit 23. Further, the controller 25 may control the drive unit 24 so as to decelerate the vehicle 20.

The controller 25 determines whether or not the vehicle 20 needs to momentarily stop before entering the railroad crossing 150, based on the information element E26. Specifically, when the controller 25 determines that the traffic light 160 is not provided at the railroad crossing 150, the controller 25 determines that the vehicle 20 needs to momentarily stop before entering the railroad crossing 150. In contrast, when the controller 25 determines that the traffic light 160 is provided at the railroad crossing 150, the controller 25 determines that the vehicle 20 does not need to momentarily stop before entering the railroad crossing 150.

Then, the controller 25 controls the presentation unit 23 so as to present the driver with information indicating results of the determination based on the information element E26. For example, the controller 25 controls the presentation unit 23 so as to present the driver with information indicating whether or not it is necessary to momentarily stop before entering the railroad crossing 150. In this manner, the controller 25 may perform presentation control so as to encourage the driver to fulfill the duty of momentarily stopping.

Further, when the controller 25 determines that the vehicle 20 needs to momentarily stop before entering the railroad crossing 150, the controller 25 controls the drive unit 24 so that the vehicle 20 momentarily stops before entering the railroad crossing 150, based on the information element E22. In this manner, the controller 25 may perform driving control so that the driver fulfills the duty of momentarily stopping.

The controller 25 determines whether entry into the railroad crossing 150 is prohibited or permitted, based on the information element E27. The controller 25 may control the presentation unit 23 so as to present the driver with information indicating results of the determination based on the information element E27. When entry into the railroad crossing 150 is prohibited, the controller 25 may control the drive unit 24 so as to cause the vehicle 20 to stop until the entry prohibition is lifted, and to enable restart of moving of the vehicle 20 once the entry prohibition is lifted.

The controller 25 presents information of at least one of the distance between the entry point and the exit point of the railroad crossing 150 on the general road 120 or the information indicating whether the railroad track 110 is a single track or includes a plurality of tracks, by using the presentation unit 23, based on the information element E25. Further, the controller 25 may control the drive unit 24 so as to reduce the speed between the entry point and the exit point of the railroad crossing 150.

Note that, when the roadside unit 40 transmits the message M4, the controller 42 may transmit a message indicating that the roadside unit 40 has transmitted the message M4, to the operation management system by radio. The message indicating that the roadside unit 40 has transmitted the message M4 may include at least one of an identifier of the roadside unit 40, at least one of the information elements constituting the message M4, or time at which the message M4 is transmitted. By receiving the message indicating that the roadside unit 40 has transmitted the message M4, the operation management system can easily confirm whether or not the roadside unit 40 or the traffic communication system including the roadside unit 40 functions normally.

Example of Operation

Figure 13:
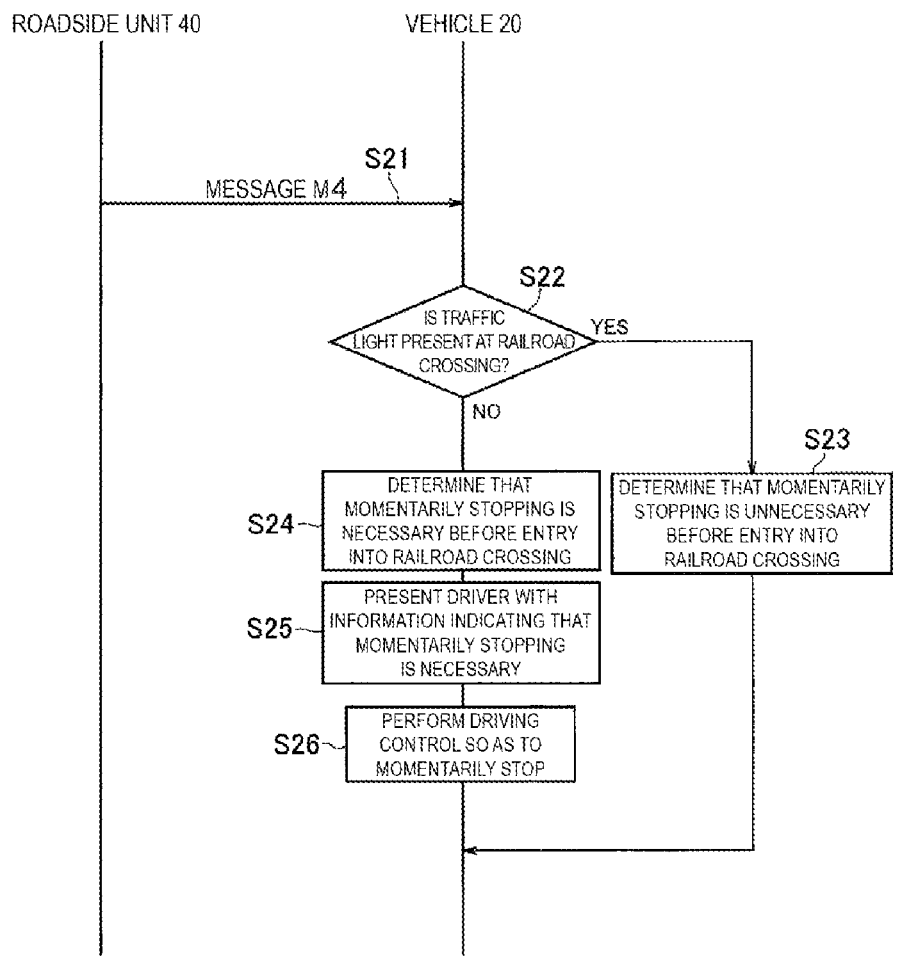
FIG. 13 is a diagram illustrating an operation example of the traffic communication system according to the second embodiment.

FIG. 13 is a diagram illustrating an operation example of the traffic communication system according to the second embodiment.

As illustrated in FIG. 13, in Step S21, the roadside unit 40 transmits the message M4. The vehicle 20 receives the message M4 from the roadside unit 40. The vehicle 20 recognizes that the railroad crossing 150 is present in a moving direction of the vehicle 20, based on the message M4.

In Step S22, the vehicle 20 determines whether or not the vehicle 20 needs to momentarily stop before entering the railroad crossing 150, based on the message M4. Here, if the vehicle 20 determines that the traffic light 160 is provided at the railroad crossing 150 (Step S22: YES), the vehicle 20 determines that the vehicle 20 does not need to momentarily stop before entering the railroad crossing 150 (Step S23).

In contrast, if the vehicle 20 determines that the traffic light 160 is not provided at the railroad crossing 150 (Step S22: NO), the vehicle 20 determines that the vehicle 20 needs to momentarily stop before entering the railroad crossing 150 (Step S24). In this case, the vehicle 20 presents the driver with information indicating that momentarily stopping is necessary before entry into the railroad crossing 150 (Step S25). Further, when the vehicle 20 is capable of automated driving, the vehicle 20 performs driving control so as to momentarily stop before entering the railroad crossing 150 (Step S26).

Modification Example of Second Embodiment

The second embodiment described above provides description of the railroad vehicle 10, the vehicle 20, and the roadside unit 40. However, a communication apparatus (communication module) provided in at least any one of the railroad vehicle 10, the vehicle 20, or the roadside unit 40 may be provided.

The second embodiment described above provides description of one example in which the traffic safety apparatus includes the railroad crossing alarm 130 and the railroad crossing gate 140, and another example in which the traffic safety apparatus includes the traffic light 160. However, instead of these, the traffic safety apparatus may be a radio unit that transmits various indications to the mobile stations (the vehicle 20 and the passerby terminal 30) by radio. The radio unit transmits a signal for giving an indication as to whether or not traveling across the railroad crossing 150 is permitted, to the mobile stations (the vehicle 20 and the passerby terminal 30). When the vehicle 20 drives in accordance with the indication from the radio unit, the vehicle 20 may determine that momentarily stopping before entry of the railroad crossing 150 is unnecessary.

Third Embodiment

The difference of a third embodiment from the first and second embodiments will mainly be described.

Conventional ITS aims to reduce traffic accidents of vehicles such as automobiles that travel on a road, but does not fully take railroad vehicles that travel on a railroad into consideration.

Thus, such conventional ITS has room for improvement in reduction of railroad crossing accidents on a railroad crossing road on which a railroad and a road intersect, in particular, railroad crossing accidents that are caused by a vehicle remaining on a railroad crossing road as a result of misjudgment of congestion ahead of the railroad crossing (so-called, congestion ahead).

In view of this, the third embodiment enables reduction of such railroad crossing accidents.

The third embodiment will be described with reference to the drawings. Note that, in the following description regarding the drawings, the same or similar parts are denoted by the same or similar reference signs.

Traffic Communication System

Figure 14:
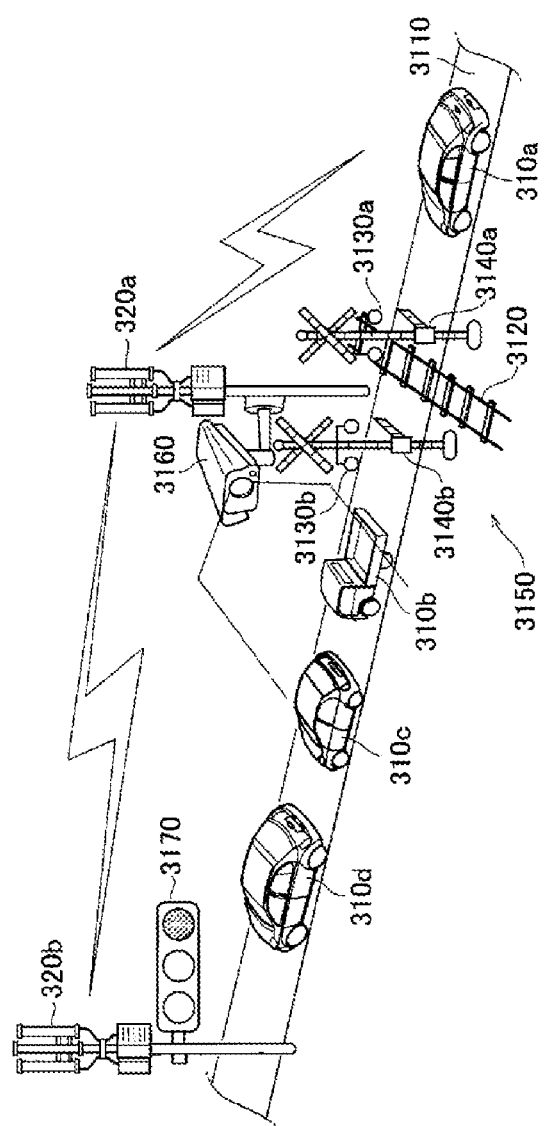
FIG. 14 is a diagram illustrating a configuration of a traffic communication system according to a third embodiment.

First, the traffic communication system according to the third embodiment will be described. FIG. 14 is a diagram illustrating a configuration of the traffic communication system according to the third embodiment.

As illustrated in FIG. 14, the traffic communication system according to the third embodiment includes vehicles 310a to 310d and roadside units 320a and 320b. In the following description, the vehicles 310a to 310d each are simply referred to as a vehicle 310 when not being distinguished from each other, and the roadside units 320a and 320b each are simply referred to as a roadside unit 320 when not being distinguished from each other. The roadside unit 320 is an example of a base station.

The vehicle 310 travels on a road 3110. FIG. 14 illustrates an example of a four-wheeled motor vehicle as the vehicle 310. However, the vehicle 310 may be a two-wheeled motor vehicle, a three-wheeled motor vehicle, or the like, or an electric bicycle or the like. Further, FIG. 14 illustrates an example of a one-lane road 3110. However, the road 3110 may include a plurality of traffic lanes.

The roadside unit 320a is provided in the vicinity of a railroad crossing road 3150 on which the road 3110 and a railroad 3120 intersect. On the railroad 3120, a railroad vehicle (not illustrated) travels. FIG. 14 illustrates an example of the railroad 3120 including one railroad track. However, the railroad 3120 may include a plurality of railroad tracks.

At the railroad crossing road 3150, railroad crossing road safety equipment is provided. FIG. 14 illustrates an example in which railroad crossing alarms 3130 (3130a and 3130b) and railroad crossing gates 3140 (3140a and 3140b) are provided as the railroad crossing road safety equipment. The railroad crossing alarm 3130 is an apparatus for informing vehicle drivers and the like traveling on the road 3110 of the presence of the railroad crossing road 3150, and, when a railroad vehicle approaches, issuing an alarm with sound and light to stop road traffic. The railroad crossing gate 3140 is an apparatus for restricting traveling on the road 3110 in order to let railroad vehicles travel preferentially. The railroad crossing gate 3140 includes a gate bar and a mechanical unit for raising and lowering the gate bar.

A sensor 3160 is provided in the vicinity of the railroad crossing road 3150. The sensor 3160 detects a traffic condition of the road 3110 on the exit side of the railroad crossing road 3150, and outputs detection results to the roadside unit 320a. It is only necessary that the sensor 3160 be a sensor capable of detecting a traffic condition. Examples of the sensor 3160 include an ultrasonic sensor, an optical sensor, and an image sensor. Note that the exit side of the railroad crossing road 3150 refers to the far side of the railroad crossing road 3150 in the traffic lane in a vehicle traveling direction. The entry side of the railroad crossing road 3150 refers to the near side of the railroad crossing road 3150 in the traffic lane in the vehicle traveling direction.

A traffic light 3170 is provided on the road 3110 on the exit side of the railroad crossing road 3150 at a distance from the railroad crossing road 3150. The traffic light 3170 is an apparatus that indicates signals for permission to proceed and instruction to stop, in order to secure traffic safety in the road 3110 or to achieve smooth traffic flow. FIG. 14 illustrates an example in which the traffic light 3170 indicates a signal with a light color for instruction to stop, and accordingly the vehicles 310*b* to 310*d* stop.

The roadside unit 320*b* is provided in the vicinity of the traffic light 3170. The roadside unit 320*b* acquires signal light color information indicating a signal light color of the traffic light 3170. The signal light color information may include not only information indicating the signal light color at the current time point, but also information indicating a transition pattern of the signal light colors for a certain period in the future. The roadside unit 320*b* transmits the signal light color information to the roadside unit 320*a* through radio communication.

The roadside unit 320*a* transmits a message to the vehicle 310*a* that travels on the road 3110 toward the entry side of the railroad crossing road 3150 through radio communication. Specifically, the roadside unit 320*a* transmits, to the vehicle 310*a*, a message including at least one information element indicating the traffic condition of the road 3110 on the exit side of the railroad crossing road 3150. For example, at least one information element indicating the traffic condition of the road 3110 on the exit side of the railroad crossing road 3150 is based on the signal light color information received by the roadside unit 320*a* from the roadside unit 320*b*, and detection information acquired by the roadside unit 320*a* from the sensor 3160.

The vehicle 310*a* receives the message from the roadside unit 320*a*. The vehicle 310*a* presents the driver of the vehicle 310*a* with the traffic condition of the road 3110 on the exit side of the railroad crossing road 3150, based on the message received from the roadside unit 320*a*. When the vehicle 310*a* is an automated driving vehicle, the vehicle 310*a* may automatically control proceeding and stopping of the vehicle 310*a* on the railroad crossing road 3150 while taking the traffic condition of the road 3110 on the exit side of the railroad crossing road 3150 into consideration, based on the message received from the roadside unit 320*a*.

In this manner, the roadside unit 320*a* transmits a message including at least one information element indicating the traffic condition of the road 3110 on the exit side of the railroad crossing road 3150 to the vehicle 310*a* that travels on the road 3110 toward the entry side of the railroad crossing road 3150. The above configuration can reduce railroad crossing accidents on the railroad crossing road 3150. The above configuration can particularly reduce railroad crossing accidents that are caused by the vehicle 310*a* remaining on the railroad crossing road 3150 as a result of misjudgment by the driver of the vehicle 310*a* regarding congestion ahead of the railroad crossing (so-called, congestion ahead).

Roadside Unit

Figure 15:
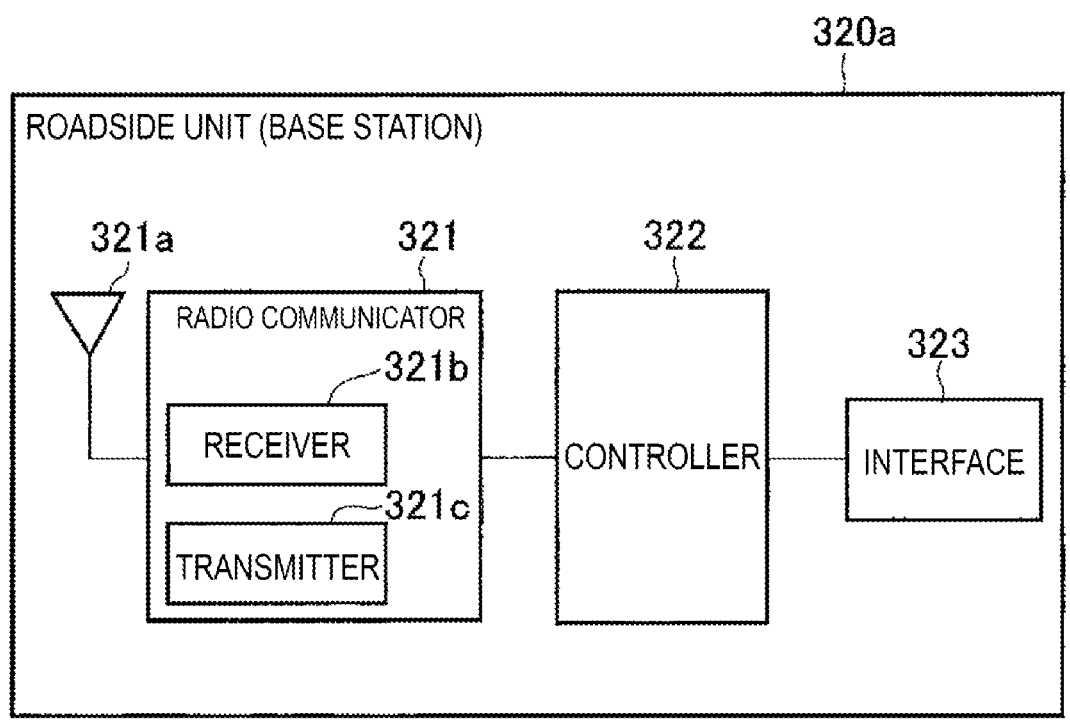
FIG. 15 is a diagram illustrating a configuration of a roadside unit according to the third embodiment.

Next, the roadside unit 320*a* according to the third embodiment will be described. FIG. 15 is a diagram illustrating a configuration of the roadside unit 320*a* according to the third embodiment.

As illustrated in FIG. 15, the roadside unit 320*a* includes an antenna 321*a*, a radio communicator 321, a controller 322, and an interface 323. The interface 323 is an interface for performing communication with the sensor 3160. The roadside unit 320*a* may further include an interface for performing communication with the railroad crossing alarm 3130 and the railroad crossing gate 3140. The roadside unit 320*a* may further include an interface for performing communication with a sensor for detecting approach of the railroad vehicle. Further, the roadside unit 320*a* may include a Global Navigation Satellite System (GNSS) receiver.

The radio communicator 321 performs radio communication via the antenna 321*a*. The antenna 321*a* may be a non-directional antenna, or may be a directional antenna having directivity toward the entry side of the railroad crossing road 3150. The antenna 321*a* may be an adaptive array antenna that can dynamically change its directivity.

The radio communication scheme of the radio communicator 321 may be a scheme that conforms to the ARIB T109, the Vehicle to Everything (V2X) standard of 3GPP, and/or the radio LAN standard such as the IEEE802.11 series. The radio communicator 321 may be configured to be capable of conforming to all of these communication standards.

The radio communicator 321 includes a receiver 321*b* that converts a radio signal received by the antenna 321*a* into a baseband signal (received packet) and outputs the baseband signal to the controller 322. Further, the radio communicator 321 includes a transmitter 321*c* that converts a baseband signal (transmission packet) to be output by the controller 322 into a radio signal and transmits the radio signal from the antenna 321*a*.

When the radio communicator 321 conforms to the ARIB T109 standard, the radio communicator 321 may have a function of performing carrier sensing by using the receiver 321*b* to determine an available state of a radio frequency (for example, the 700 MHz band). The transmitter 321*c* of the radio communicator 321 may transmit packets at timing determined according to results of carrier sensing. One message may include one or more packets.

For example, the radio communicator 321 performs roadside-to-roadside communication with another roadside unit 320*b*. The roadside-to-roadside communication may be performed by unicasting, or may be performed by broadcasting or multicasting. The receiver 321*b* of the radio communicator 321 receives roadside-to-roadside communication packets from the roadside unit 320*b*. The roadside-to-roadside communication packets may include identification information used for identification of a transmission source. The receiver 321*b* receives a message including one or more packets from the roadside unit 320*b*. The message includes the signal light color information described above.

The radio communicator 321 performs roadside-to-vehicle communication with the vehicle 310. The roadside-to-vehicle communication may be performed by unicasting, or may be performed by broadcasting or multicasting. The roadside-to-vehicle communication packets transmitted to the vehicle 310 may include identification information used for identification of a transmission source, synchronization information indicating a method of synchronization with the roadside unit 320*a*, period information indicating transmission time of the packets and/or a period of roadside-to-vehicle communication (for example, the number of times of transfer in the roadside-to-vehicle communication and/or a period length of the roadside-to-vehicle communication), and the like.

The transmitter 321*c* of the radio communicator 321 transmits a message including one or more packets to the vehicle 310 through roadside-to-vehicle communication. The message is generated by the controller 322.

The controller 322 includes a control circuit that includes at least one memory and at least one processor electrically connected to the memory. The controller 322 controls various functions of the roadside unit 320*a*. The controller 322 periodically generates the message for the vehicle 310, and periodically transmits the message via the transmitter 321*c*.

Figure 16A:
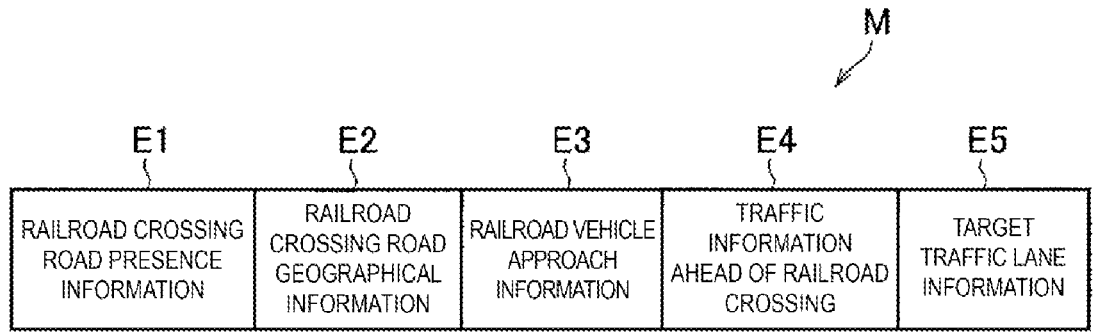
FIG. 16A is a diagram illustrating a configuration of a message for a vehicle according to the third embodiment.
Figure 16B:
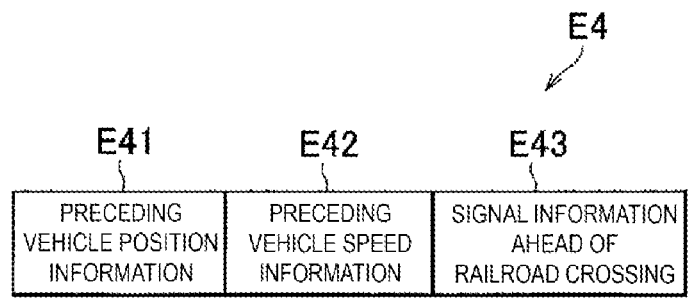
FIG. 16B is a diagram illustrating a configuration of a message for the vehicle according to the third embodiment.
Figure 16C:
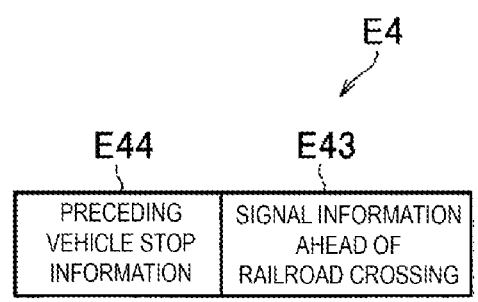
FIG. 16C is a diagram illustrating a configuration of a message for the vehicle according to the third embodiment.

FIGS. 16A to 16C are each a diagram illustrating a configuration of a message M for the vehicle 310 according to the third embodiment. The message M may be a message that is transmitted and received in layer 2 or layer 3 of the OSI reference model, or may be a message that is transmitted and received in an application layer.

As illustrated in FIG. 16A, the message M includes information elements E1 to E5.

The information element E1 is railroad crossing road presence information indicating that the railroad crossing road 3150 is present on the road 3110. The information element E1 may be a flag in which "1" is set when the railroad crossing road 3150 is present, and "0" is set when the railroad crossing road 3150 is not present.

The information element E2 is railroad crossing road geographical information indicating a geographical attribute of the railroad crossing road 3150. The information element E2 includes information indicating the geographical position (latitude and longitude) of the railroad crossing road 3150. The information element E2 may include information indicating the scale of the railroad crossing road 3150, for example, a distance between the entry point and the exit point thereof. The information indicating the distance between the entry point and the exit point of the railroad crossing road 3150 may be a numerical value (for example, meters) indicating the distance, or may be information indicating whether the railroad 3120 is a single track or includes a plurality of tracks.

The information element E3 is railroad vehicle approach information indicating whether or not approach of the railroad vehicle to the railroad crossing road 3150 is detected. The information element E3 may be a flag in which "1" is set when approach of the railroad vehicle is detected, and "0" is set when approach of the railroad vehicle is not detected. The information element E3 may indicate whether or not the railroad crossing alarm 3130 performs alarm operation, or may indicate whether or not the railroad crossing gate 3140 performs shutting operation.

The information element E4 is at least one information element indicating the traffic condition of the road 3110 on the exit side of the railroad crossing road 3150 (traffic information ahead of the railroad crossing). FIG. 16B illustrates a configuration example 1 of the information element E4. FIG. 16C illustrates a configuration example 2 of the information element E4.

As illustrated in FIG. 16B, the information element E4 includes an information element E41 indicating latitude and longitude of the preceding vehicle 310b present on the road 3110 on the exit side of the railroad crossing road 3150 (preceding vehicle position information), and an information element E42 indicating moving speed of the preceding vehicle 310b (preceding vehicle speed information). The preceding vehicle 310b refers to the vehicle 310 that is closest to the railroad crossing road 3150 on the exit side of the railroad crossing road 3150, that is, the vehicle 310 that has most recently passed through the railroad crossing road 3150.

The information element E41 may be information indicating whether or not the preceding vehicle 310b is present on the exit side of the railroad crossing road 3150. The information element E42 may be a numerical value (for example, kilometers per hour) indicating the moving speed of the preceding vehicle 310b, or may be a flag indicating whether or not the preceding vehicle 310b is in a stopping state. The stopping state refers to a state in which the moving speed is less than a threshold, and refers to, for example, a state in which the moving speed is zero.

As illustrated in FIG. 16C, the information element E4 includes an information element E44 indicating whether or not the preceding vehicle 310b in the stopping state is present on the road 3110 on the exit side of the railroad crossing road 3150 (preceding vehicle stop information). The information element E44 may be a flag in which "1" is set when the preceding vehicle 310b in the stopping state is present on the road 3110 on the exit side of the railroad crossing road 3150, and "0" is set when the preceding vehicle 310b is not present.

The controller 322 may generate the information elements E41, E42, and E44, based on detection results obtained by the sensor 3160. Alternatively, the controller 322 may generate the information elements E41, E42, and/or E44, based on a message received by the receiver 321b from the preceding vehicle 310b through roadside-to-vehicle communication. The message includes position information indicating the geographical position of the preceding vehicle 310b, and speed information indicating moving speed of the preceding vehicle 310b.

When the traffic light 3170 is provided on the road 3110 on the exit side of the railroad crossing road 3150 at a distance from the railroad crossing road 3150, the information element E4 includes an information element E43 indicating the signal light color of the traffic light 3170 (signal information ahead of the railroad crossing). The information element E43 may include not only information indicating the signal light color at the current time point, but also information indicating a transition pattern of the signal light colors for a certain period in the future.

The controller 322 may generate the information element E43, based on the signal light color information received by the receiver 321b from another roadside unit 320b through roadside-to-roadside communication. Alternatively, the controller 322 may generate the information element E43, based on the signal light color information acquired from a traffic management center (not illustrated) via a communication line.

When the road 3110 includes a plurality of traffic lanes in which two-way traffic is allowed, the message M may include an information element E5 for identifying a traffic lane being a target of the information element E4 (target traffic lane information). The information element E5 may be an identifier of the traffic lane being the target of the information element E4, or may be information indicating a vehicle traveling direction (orientation) of the traffic lane being the target of the information element E4.

Vehicle

Figure 17:
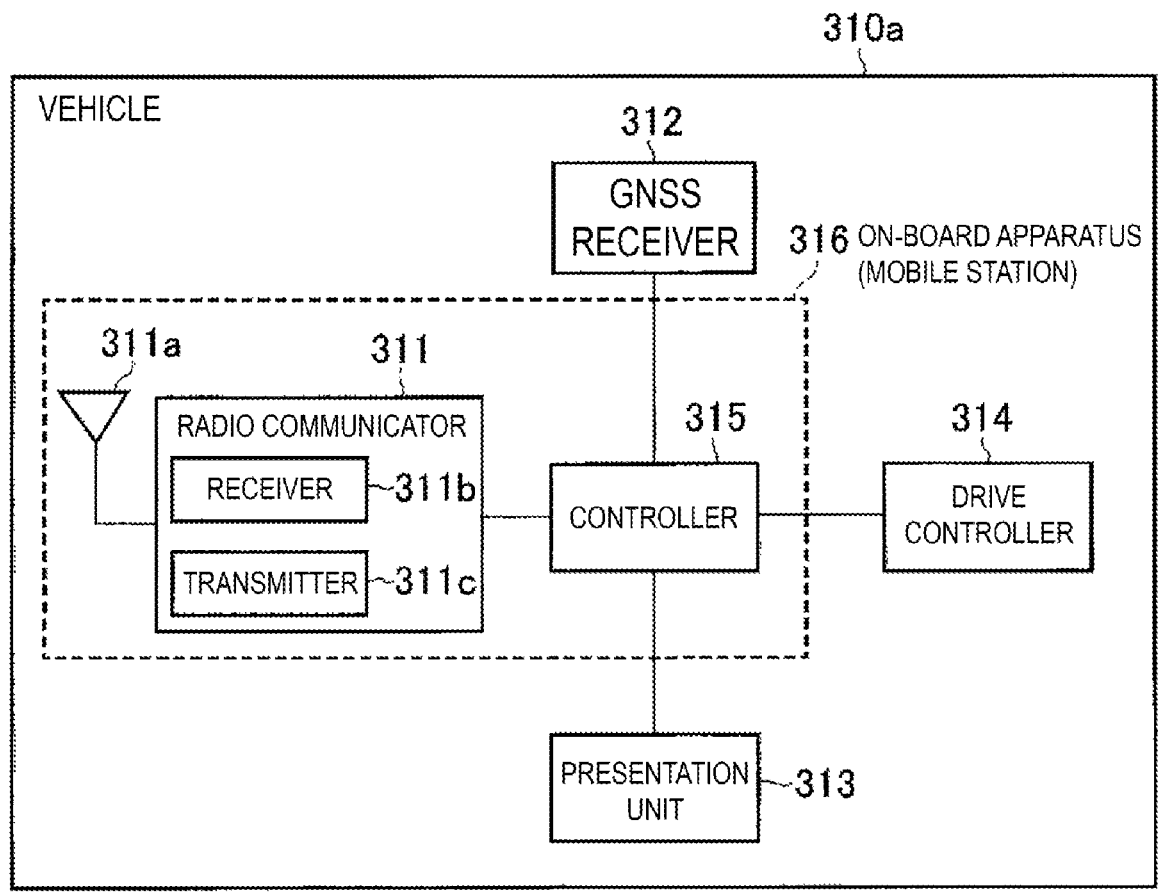
FIG. 17 is a diagram illustrating a configuration of the vehicle according to the third embodiment.

Next, the vehicle 310a according to the third embodiment will be described. FIG. 17 is a diagram illustrating a configuration of the vehicle 310a according to the third embodiment.

As illustrated in FIG. 17, the vehicle 310a includes a GNSS receiver 312, a presentation unit 313, a drive controller 314, and an on-board apparatus 316. The on-board apparatus 316 is an example of a mobile station provided in the vehicle 310a. The on-board apparatus 316 includes an antenna 311a, a radio communicator 311, and a controller 315.

The radio communicator 311 performs radio communication via the antenna 311a. The antenna 311a may be a non-directional antenna, or may be a directional antenna having directivity.

The radio communication scheme of the radio communicator 311 may be a scheme that conforms to the ARIB T109, the V2X standard of 3GPP, and/or the radio LAN standard such as the IEEE802.11 series. The radio communicator 311 may be configured to be capable of conforming to all of these communication standards.

The radio communicator 311 includes a receiver 311b that converts a radio signal received by the antenna 311a into a baseband signal (received packet) and outputs the baseband signal to the controller 315. Further, the radio communicator 311 includes a transmitter 311c that converts a baseband signal (transmission packet) to be output by the controller 315 into a radio signal and transmits the radio signal from the antenna 311a.

When the radio communicator 311 conforms to the ARIB T109 standard, the radio communicator 311 may have a function of performing carrier sensing by using the receiver 311b to determine an available state of a radio frequency (for example, the 700 MHz band). The transmitter 311c of the radio communicator 311 may transmit packets at timing determined according to results of carrier sensing. One message may include one or more packets.

The radio communicator 311 performs roadside-to-vehicle communication with the roadside unit 320a. The roadside-to-vehicle communication may be performed by unicasting, or may be performed by broadcasting. The receiver 311b of the radio communicator 311 receives the message M from the roadside unit 320a.

The GNSS receiver 312 performs positioning, based on GNSS satellite signals, and outputs position information indicating the current geographical position (latitude and longitude) of the vehicle 310a to the controller 315.

Under control of the controller 315, the presentation unit 313 presents information to a driver of the vehicle 310a. For example, the presentation unit 313 includes at least one of a display that displays information or a speaker that outputs information with voice. In the following description, presentation of information refers to at least one of display of information or output of information with voice.

The drive controller 314 controls an engine or a motor as a source of power, a power transmission mechanism, brakes, and the like. If the vehicle 310a is an automated driving vehicle, the drive controller 314 may control drive of the vehicle 310a in cooperation with the controller 315.

The controller 315 includes a control circuit that includes at least one memory and at least one processor electrically connected to the memory. The controller 315 controls various functions of the vehicle 310a (on-board apparatus 316).

For example, the controller 315 controls the presentation unit 313, based on the message M received by the receiver 311b from the roadside unit 320a.

The controller 315 may control the presentation unit 313 so as to present information indicating that the railroad crossing road 3150 is present in a moving direction of the vehicle 310a, based on the information element E1 (railroad crossing road presence information) included in the message M.

The controller 315 may control the presentation unit 313 so as to present information indicating a geographical attribute of the railroad crossing road 3150, based on the information element E2 (railroad crossing road geographical information) included in the message M. Here, the controller 315 may control the presentation unit 313 so as to present information indicating a distance between the current position of the vehicle 310a and the position of the railroad crossing road 3150.

The controller 315 may control the presentation unit 313 so as to present information indicating whether or not approach of a railroad vehicle to the railroad crossing road 3150 is detected, based on the information element E3 (railroad vehicle approach information) included in the message M.

The controller 315 may control the presentation unit 313 so as to present information indicating a traffic condition of the road 3110 on the exit side of the railroad crossing road 3150, based on the information element E4 (traffic information ahead of the railroad crossing) included in the message M.

For example, the following case is assumed: the controller 315 determines that the preceding vehicle 310b in the stopping state is present on the road 3110 on the exit side of the railroad crossing road 3150, based on the information element E41 (preceding vehicle position information) and the information element E42 (preceding vehicle speed information), or the information element E44 (preceding vehicle stop information). In this case, the controller 315 controls the presentation unit 313 so as to present information indicating the above-described details. Here, the controller 315 may call the attention of the driver by presenting information such as "Beware of entry into railroad crossing" and "There is congestion ahead of railroad crossing. Beware of entry."

The following case is assumed: the controller 315 determines that the traffic light 3170 present on the exit side of the railroad crossing road 3150 indicates a signal for instruction to stop, based on the information element E43 (signal information ahead of the railroad crossing). In this case, the controller 315 controls the presentation unit 313 so as to present information indicating the above-described details. Here, the controller 315 may call attention of the driver by presenting information such as "Signal is red ahead of railroad crossing. Beware of entry."

When the road 3110 includes a plurality of traffic lanes in which two-way traffic is allowed, the controller 315 may determine whether or not to present information based on the information element E4, based on the information element E5 (target traffic lane information) included in the message M. Specifically, the controller 315 presents information based on the information element E4, only when the traffic lane on which the vehicle 310a travels and the traffic lane indicated by the information element E5 match.

When the vehicle 310a is an automated driving vehicle, the controller 315 may control drive of the vehicle 310a, based on the message M received by the receiver 311b from the roadside unit 320a.

The controller 315 may perform control so as to cause the vehicle 310a to decelerate when the vehicle 310a approaches the railroad crossing road 3150, and to cause the vehicle 310a to momentarily stop in front of the railroad crossing road 3150, based on the information element E1 (railroad crossing road presence information) and the information element E2 (railroad crossing road geographical information) included in the message M.

Further, the following case is assumed: the controller 315 determines that approach of a railroad vehicle to the railroad crossing road 3150 is detected, based on the information element E3 (railroad vehicle approach information) included in the message M. In this case, the controller 315 may perform control so as to continue the stopping state of the vehicle 310a until the railroad vehicle has passed through the railroad crossing road 3150.

The controller 315 may control entry of the vehicle 310a into the railroad crossing road 3150 while taking the traffic condition of the road 3110 on the exit side of the railroad crossing road 3150 into consideration, based on the information element E4 (traffic information ahead of the railroad crossing) included in the message M.

For example, the following case is assumed: the controller 315 determines that the preceding vehicle 310b in the stopping state is present on the road 3110 on the exit side of the railroad crossing road 3150, based on the information element E41 (preceding vehicle position information) and the information element E42 (preceding vehicle speed information), or the information element E44 (preceding vehicle stop information). In this case, the controller 315 may perform control so as to continue the stopping state of the vehicle 310a until the preceding vehicle 310b restarts moving or the preceding vehicle 310b goes away from the railroad crossing road 3150 by a predetermined distance.

The following case is assumed: the controller 315 determines that the traffic light 3170 present on the exit side of the railroad crossing road 3150 indicates a signal for instruction to stop, based on the information element E43 (signal information ahead of the railroad crossing). In this case, the controller 315 may perform control so as to continue the stopping state of the vehicle 310a until the traffic light 3170 is switched to a signal indicating permission to proceed.

When the road 3110 includes a plurality of traffic lanes in which two-way traffic is allowed, the controller 315 may determine, based on the information element E5 (target traffic lane information) included in the message M, whether or not to present information based on the information element E4. Specifically, the controller 315 performs drive control of the vehicle 310a based on the information element E4, only when the traffic lane on which the vehicle 310a travels and the traffic lane indicated by the information element E5 match.

Operation Sequence Example

Figure 18:
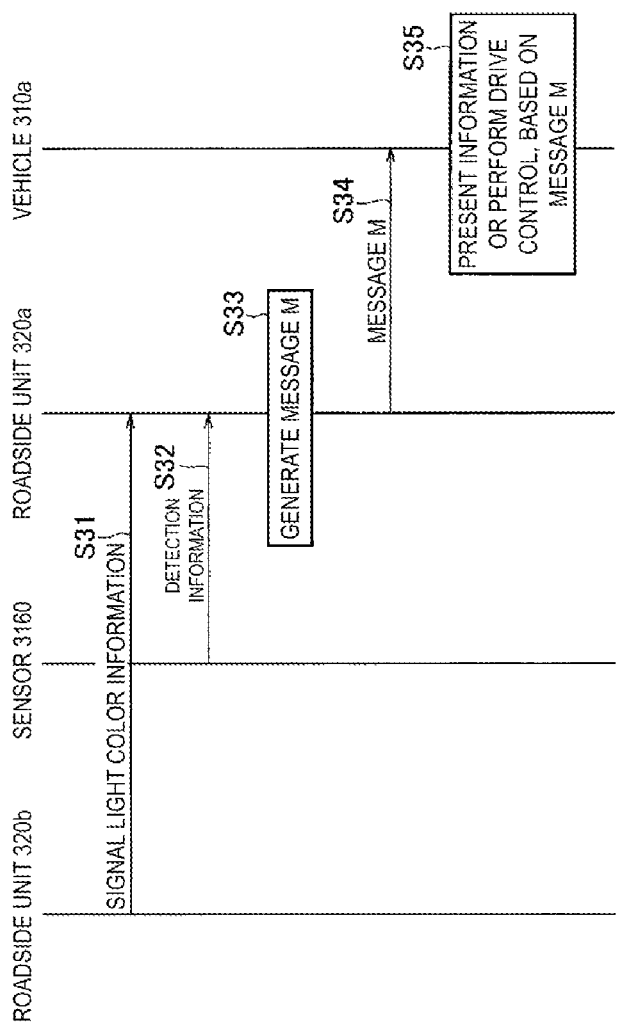
FIG. 18 is a diagram illustrating an operation sequence example of the traffic communication system according to the third embodiment.

FIG. 18 is a diagram illustrating an operation sequence example of the traffic communication system according to the third embodiment. The sequence illustrated in FIG. 18 may be periodically executed.

As illustrated in FIG. 18, in Step S31, the receiver 321b of the roadside unit 320a receives the signal light color information from the roadside unit 320b through roadside-to-roadside communication.

In Step S32, the controller 322 of the roadside unit 320a acquires the detection information from the sensor 3160 via the interface 323. Note that the order of Step S31 and Step S32 may be inverted.

In Step S33, the controller 322 of the roadside unit 320a generates the message M.

In Step S34, the transmitter 321c of the roadside unit 320a transmits the generated message M to the vehicle 310a through roadside-to-vehicle communication. The receiver 311b of the vehicle 310a receives the message M from the roadside unit 320a.

In Step S35, the controller 315 of the vehicle 310a presents information or performs drive control of the vehicle 310a based on the received message M.

Modification Example of Third Embodiment

The third embodiment described above provides description of an example in which the information element related to the preceding vehicle 310b and the information element related to the traffic light 3170 are individually included in the information element E4 indicating the traffic condition of the road 3110 on the exit side of the railroad crossing road 3150 (traffic information ahead of the railroad crossing).

Here, it is conceivable that the information element related to the preceding vehicle 310b indicates the stopping state of the preceding vehicle 310b at the current time point on the exit side of the railroad crossing road 3150. Further, it is conceivable that the information element related to the traffic light 3170 indicates a congestion state in the near future on the exit side of the railroad crossing road 3150.

However, the roadside unit 320a determines whether or not to permit entry of the vehicle 310a into the railroad crossing road 3150 by taking the condition of both of the preceding vehicle 310b and the traffic light 3170 into consideration. Then, the roadside unit 320a may transmit, to the vehicle 310a, one information element indicating whether or not to permit entry of the vehicle 310a into the railroad crossing road 3150 as the information element E4 (traffic information ahead of the railroad crossing).

For example, when the roadside unit 320a determines that the preceding vehicle 310b stops on the exit side of the railroad crossing road 3150 or that there will be congestion on the exit side of the railroad crossing road 3150 in the near future, the roadside unit 320a transmits, to the vehicle 310a, the information element E4 indicating the entry prohibition into the railroad crossing road 3150 (traffic information ahead of the railroad crossing).

A program for causing a computer to execute each process performed by the vehicle 310 (on-board apparatus 316) and a program for causing a computer to execute each process performed by the roadside unit 320 may be provided. The program may be recorded in a computer readable medium. Use of a computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

Circuits for performing the processes performed by the vehicle 310 (on-board apparatus 316) may be integrated, and at least a portion of the vehicle 310 (on-board apparatus 316) may be configured by a semiconductor integrated circuit (chip set, SoC). Circuits for performing the processes performed by the roadside unit 320 may be integrated, and the roadside unit 320 may be configured by a semiconductor integrated circuit (chip set, SoC).

The first to third embodiments have been described above in detail with reference to the drawings; however, specific configurations are not limited to those described above, and various design modifications and the like can be made without departing from the gist of the present disclosure.

The invention claimed is:

1. A base station provided in a vicinity of a railroad crossing road at which a railroad and a road intersect, the base station comprising:
 a transmitter configured to transmit, through radio communication, a message to a vehicle traveling on the road toward an entry side of the railroad crossing road, wherein
 the transmitter is configured to transmit the message to the vehicle, the message including at least one information element indicating a traffic condition of the road on an exit side of the railroad crossing road.

2. The base station according to claim 1, further comprising:
 a controller configured to acquire a detection result from a sensor configured to detect the traffic condition of the road on the exit side of the railroad crossing road, wherein
 the transmitter is configured to transmit the message including the at least one information element to the vehicle, based on the detection result of the sensor.

3. The base station according to claim 1, wherein
 the transmitter is configured to transmit the message to the vehicle, the message including an information element indicating moving speed of a preceding vehicle present on the road on the exit side of the railroad crossing road.

4. The base station according to claim 1, wherein the transmitter is configured to transmit the message to the vehicle, the message including an information element indicating whether or not a preceding vehicle in a stopping state is present on the road on the exit side of the railroad crossing road.

5. The base station according to claim 1, wherein the transmitter is configured to transmit, to the vehicle, the message including an information element indicating a signal light color of a traffic light when the traffic light is provided on the road on the exit side of the railroad crossing road at a distance from the railroad crossing road.

6. The base station according to claim 5, further comprising:
a receiver configured to receive, through radio communication, information indicating the signal light color of the traffic light from another base station associated with the traffic light, wherein
the transmitter is configured to transmit, to the vehicle, the message including an information element indicating the signal light color of the traffic light, based on the information received by the receiver.

7. The base station according to claim 1, wherein the transmitter is configured to transmit, to the vehicle, the message further including an information element for identifying a traffic lane being a target of the at least one information element, when the road includes a plurality of traffic lanes in which two-way traffic is allowed.

8. The base station according to claim 1, wherein the transmitter is configured to transmit, to the vehicle, the message further including an information element indicating a geographical attribute of the railroad crossing road.

9. The base station according to claim 1, wherein the transmitter is configured to transmit, to the vehicle, the message further including an information element indicating whether or not approach of a railroad vehicle to the railroad crossing road is detected.

10. The base station according to claim 1, wherein the message further includes position information of a preceding vehicle on an exit side of the railroad crossing road.

11. The base station according to claim 10, wherein the position information indicates latitude and longitude of the preceding vehicle.

12. The base station according to claim 10, wherein the message further includes heading information indicating a direction of travel of the preceding vehicle.

13. A traffic communication system comprising:
a vehicle; and
a base station provided in a vicinity of a railroad crossing road at which a railroad and a road intersect, the base station comprising:
a transmitter configured to transmit, through radio communication, a message to the vehicle traveling on the road toward an entry side of the railroad crossing road, wherein the transmitter is configured to transmit the message to the vehicle, the message including at least one information element indicating a traffic condition of the road on an exit side of the railroad crossing road.

14. A vehicle comprising:
a receiver configured to receive, through radio communication, a message from a base station provided in a vicinity of a railroad crossing road at which a railroad and a road intersect, the message including at least one information element indicating a traffic condition of the road on an exit side of the railroad crossing road.

* * * * *